US011873100B2

(12) United States Patent
Wake et al.

(10) Patent No.: US 11,873,100 B2
(45) Date of Patent: Jan. 16, 2024

(54) DRONE SYSTEM, DRONE, MOVABLE BODY, DRONE SYSTEM CONTROL METHOD, AND DRONE SYSTEM CONTROL PROGRAM

(71) Applicant: NILEWORKS INC., Tokyo (JP)

(72) Inventors: Chihiro Wake, Tokyo (JP); Hiroshi Yanagishita, Tokyo (JP)

(73) Assignee: NILEWORKS INC., Tokyo (JP)

( * ) Notice: Subject to any disclaimer, the term of this patent is extended or adjusted under 35 U.S.C. 154(b) by 207 days.

(21) Appl. No.: 17/299,956

(22) PCT Filed: Dec. 4, 2019

(86) PCT No.: PCT/JP2019/047368
§ 371 (c)(1),
(2) Date: Jun. 4, 2021

(87) PCT Pub. No.: WO2020/116492
PCT Pub. Date: Jun. 11, 2020

(65) Prior Publication Data
US 2022/0024588 A1 Jan. 27, 2022

(30) Foreign Application Priority Data
Dec. 5, 2018 (JP) ................. 2018-227827

(51) Int. Cl.
B64D 1/18 (2006.01)
B60L 50/60 (2019.01)
(Continued)

(52) U.S. Cl.
CPC ................ B64D 1/18 (2013.01); B60L 50/60 (2019.02); B60L 58/12 (2019.02); B64C 39/024 (2013.01);
(Continued)

(58) Field of Classification Search
CPC .......... B64D 1/18; B64D 27/24; B64D 45/04; B60L 50/60; B60L 58/12; B60L 2200/10;
(Continued)

(56) References Cited

U.S. PATENT DOCUMENTS 10,078,808 B1  9/2018 Sibon
10,767,347 B2  9/2020 Nishi et al.
(Continued)

FOREIGN PATENT DOCUMENTS

CN  107657412 A  2/2018
CN  108290633 A  7/2018
(Continued)

OTHER PUBLICATIONS

Avoiding a Crash by Understanding the "Return to Home" Feature by Rick Scherle | Feb. 9, 2017 (Year: 2017).*
(Continued)

Primary Examiner — Alan D Hutchinson
(74) Attorney, Agent, or Firm — MATTINGLY & MALUR, PC

(57) ABSTRACT

There is provided a drone system in which a drone and a movable body operate in coordination with each other, the movable body being capable of moving with the drone aboard and allowing the drone to make a takeoff and a landing, the movable body including: a takeoff-landing area on which the drone can be placed and that serves as a takeoff-landing point from and on which the drone takes off and lands; a movement control section capable of moving the movable body together with the drone aboard; and a movable body transmission section that sends information on the movable body, the drone including: a flight control section that causes the drone to fly; and a drone reception section that receives information on the movable body,
(Continued)

wherein the drone sends, to the movable body, a position of a takeoff-landing point at a time when the drone takes off.

32 Claims, 21 Drawing Sheets

(51) Int. Cl.
| | |
|---|---|
| B60L 58/12 | (2019.01) |
| B64C 39/02 | (2023.01) |
| B64D 27/24 | (2006.01) |
| B64F 1/36 | (2017.01) |
| G05D 1/10 | (2006.01) |
| A01M 7/00 | (2006.01) |
| B64U 10/13 | (2023.01) |
| B64U 50/19 | (2023.01) |
| B64U 80/86 | (2023.01) |
| B64U 101/00 | (2023.01) |

(52) U.S. Cl.
CPC .............. *B64D 27/24* (2013.01); *B64F 1/364* (2013.01); *G05D 1/101* (2013.01); *A01M 7/0089* (2013.01); *B60L 2200/10* (2013.01); *B64U 10/13* (2023.01); *B64U 50/19* (2023.01); *B64U 80/86* (2023.01); *B64U 2101/00* (2023.01); *B64U 2201/20* (2023.01)

(58) Field of Classification Search
CPC .... B60L 2240/622; B60L 53/66; B60L 53/80; B64C 39/024; B64C 39/02; B64F 1/364; G05D 1/101; A01M 7/0089; A01M 7/00; B64U 10/13; B64U 50/19; B64U 80/86; B64U 2101/00; B64U 2201/20; B64U 2201/10; Y02T 10/70; Y02T 10/7072; Y02T 10/72; Y02T 90/12; Y02T 90/16

See application file for complete search history.

(56) References Cited

U.S. PATENT DOCUMENTS

| | | | |
|---|---|---|---|
| 2017/0129603 A1 | 5/2017 | Raptopoulos et al. | |
| 2017/0323257 A1* | 11/2017 | Cheatham, III | ... G06Q 10/0832 |
| 2018/0001812 A1 | 1/2018 | Friemel et al. | |
| 2018/0101173 A1 | 4/2018 | Banerjee et al. | |
| 2018/0196418 A1* | 7/2018 | Meier | .................. G05D 1/0011 |
| 2021/0155344 A1* | 5/2021 | Mura Yañez | .......... B64U 70/00 |
| 2022/0073204 A1 | 3/2022 | Raptopoulos et al. | |

FOREIGN PATENT DOCUMENTS

| | | |
|---|---|---|
| CN | 108628346 A | 10/2018 |
| CN | 108699814 A | 10/2018 |
| JP | 02-114099 A | 4/1990 |
| JP | 08-142740 A | 6/1996 |
| JP | 2001-120151 | 5/2001 |
| JP | 2002-287825 A | 10/2002 |
| JP | 2006-180326 A | 7/2006 |
| JP | 2007-302103 A | 11/2007 |
| JP | 2003-312587 A | 12/2007 |
| JP | 2007-334500 A | 12/2007 |
| JP | 2011-046364 A | 3/2011 |
| JP | 2011-183976 A | 9/2011 |
| JP | 2011-204145 A | 10/2011 |
| JP | 2012-232654 A | 11/2012 |
| JP | 2017-013653 A | 1/2017 |
| JP | 2017-21757 A | 1/2017 |
| JP | 2017-27396 A | 2/2017 |
| JP | 2017-71395 A | 4/2017 |
| JP | 2017-163265 | 9/2017 |
| JP | 2018-165205 A | 10/2018 |
| KR | 10-2017-0004508 A | 1/2017 |
| KR | 10-2018-0015985 A | 2/2018 |
| WO | 2016/205415 A1 | 12/2016 |
| WO | 2017/006421 A1 | 1/2017 |
| WO | 2017/099070 A1 | 6/2017 |
| WO | 2017/131194 A1 | 8/2017 |
| WO | 2017/175804 A1 | 10/2017 |
| WO | 2018/109903 A1 | 6/2018 |
| WO | 2018/155700 A1 | 8/2018 |

OTHER PUBLICATIONS

International Search Report of PCT/JP2019/047368 dated Mar. 3, 2020.
International Search Report of PCT/JP2019/047214 dated Feb. 10, 2020.
Japanese Office Action received in corresponding Japanese Application No. JP2020-508635 dated Mar. 25, 2021.
Japanese Office Action received in corresponding Japanese Application No. JP2020-515274 dated Mar. 25, 2021.
Japanese Office Action received in corresponding Japanese Application No. JP2020-512894 dated Mar. 25, 2021.
International Search Report of PCT/JP2019/047215 dated Feb. 4, 2020.
Japanese Office Action received in corresponding Japanese Application No. 2020-512894 dated Sep. 22, 2021.
Japanese Office Action received in corresponding Japanese Application No. 2020-559956 dated Apr. 15, 2022.
Japanese Office Action received in corresponding Japanese Application No. 2020-559956 dated Sep. 14, 2022.
Japanese Office Action received in corresponding Japanese Application No. 2020-559957 dated Apr. 15, 2022.
Japanese Office Action received in corresponding Japanese Application No. 2020-559957 dated Oct. 4, 2022.
International Search Report received in corresponding International Application No. PCT/JP2019/047371 dated Feb. 10, 2020.
International Search Report received in corresponding International Application No. PCT/JP2019/047372 dated Feb. 10, 2020.
Chinese Office Action received in corresponding Chinese Application No. 201980079698.1 dated Apr. 26, 2023.
Chinese Office Action received in corresponding Chinese Application No. 201980079698.1 dated Sep. 27, 2023 w/partial translation.

* cited by examiner

DRONE SYSTEM, DRONE, MOVABLE BODY, DRONE SYSTEM CONTROL METHOD, AND DRONE SYSTEM CONTROL PROGRAM

TECHNICAL FIELD

The invention of the present application relates to a drone system, a drone, a movable body, a control method for a drone system, and a drone system control program.

BACKGROUND ART

Application of a small helicopter (multicopter) generally called a drone has progressed. One of important fields of the application is spreading a chemical agent, such as agrochemical and liquid fertilizer, over farmland (an agricultural field) (e.g., see Patent Literature 1). For relatively narrow farmland, using a drone rather than a manned airplane or helicopter is often suitable.

Thanks to a technology such as a quasi-zenith satellite system and a real time kinematic-global positioning system (RTK-GPS), it is possible to grasp an absolute position of a drone in flight accurately down to several centimeters, thereby enabling autonomous flight with a minimum of manual control and efficient, and accurate spreading of a chemical agent even in farmland having a narrow, complicated terrain, which is typically seen in Japan.

On the other hand, as for autonomous flying drones for spreading an agricultural chemical agent, it is difficult to say that consideration is sufficiently given to their safety. A drone equipped with a chemical agent weighs several tens of kilograms, and thus occurrence of an accident such as falling onto a person can cause a serious consequence. In addition, it is necessary to provide a foolproof scheme for drones because an operator of a drone is typically not an expert; however, consideration of such a foolproof system has been insufficient. Hitherto, although there has been a technique for safety of a drone predicated upon control by human (e.g., see Patent Literature 2), there has been no technique for dealing with a safety issue peculiar to an autonomous flying drone for spreading an agricultural chemical agent.

To cause a drone to fly over an agricultural field, a movable body that transports the drone to a predetermined location in the vicinity of the agricultural field is needed. In addition, to allow the drone to take off from and land on the predetermined location, a drone system in which the drone and the movable body exchange information with each other to operate in coordination with each other is needed.

CITATION LIST

Patent Literature

Patent Literature 1: Japanese Patent Laid-Open No. 2001-120151
Patent Literature 2: Japanese Patent Laid-Open No. 2017-163265

SUMMARY OF INVENTION

Technical Problem

An objective of the present invention is to provide a drone system that enables operational coordination between a drone and a movable body that is capable of moving with the drone aboard and allows the drone to make a takeoff and a landing, so as to maintain a high safety even in an autonomous flight of the drone.

Solution to Problem

A drone system according to an aspect of the present invention to achieve the objective described above is a drone system in which a drone and a movable body operate in coordination with each other, the movable body being capable of moving with the drone aboard and allowing the drone to make a takeoff and a landing, the movable body including: a takeoff-landing area on which the drone can be placed and that serves as a takeoff-landing point from and on which the drone takes off and lands; a movement control section capable of moving the movable body together with the drone aboard; and a movable body transmission section that sends information on the movable body, the drone including: a flight control section that causes the drone to fly; and a drone reception section that receives information on the movable body, wherein the drone sends, to the movable body, a position of the takeoff-landing point at a time when the drone takes off.

The flight control section may determine a position at which the drone is to land based on the information on the movable body received by the drone reception section.

The movable body may include a position acquiring section that acquires the position of the takeoff-landing point, the movable body transmission section may be configured to be capable of notifying the drone reception section of the position of the takeoff-landing point, and the drone may be configured to determine a position at which the drone is to land based on the position of the takeoff-landing point.

The drone may be configured to send information on at least one of a position at which the drone is to land, a required time until a landing, and a planned landing time, to the movable body.

The drone may be a drone that flies within a target area to perform a predetermined operation, and the drone may be configured to send, to the movable body, information on an access route that connects the takeoff-landing point and an access point through which the drone enters the target area.

The movable body may include an ambient environment acquiring section that acquires information on an ambient environment of the takeoff-landing point, the movable body transmission section may be configured to be capable of notifying the drone reception section of the information on the ambient environment, and the drone may be configured to determine appropriateness of a landing based on the information on the ambient environment.

The movable body may include a mode switching mechanism capable of switching at least between a mode in which the movable body can move and a mode in which the drone can take off from and land on the movable body, and the movable body transmission section may be capable of notifying the drone reception section of the mode of the movable body.

The drone system may further include an aboard state acquiring section capable of acquiring aboard information indicating whether the drone is fixed to the takeoff-landing point for the movable body to be in a state of being capable of moving safely, and the aboard state acquiring section may be configured to determine whether to permit the movable body to move or not based on the aboard information.

The movable body transmission section may be capable of notifying the drone reception section of the aboard information.

The aboard state acquiring section may be included in at least one of the drone and the movable body.

The movable body may further include a driving state acquiring section that acquires driving information indicating whether the movable body is moving or is in a state of being capable of moving, and the movable body may be configured to be capable of notifying the drone reception section of the driving information via the movable body transmission section.

The drone may be equipped with a battery, the drone may be configured to be capable of performing replenishment of the battery loaded in the drone at the takeoff-landing point, and the movable body may be configured to be capable of notifying the drone of battery replenishment information indicating a status of a replenishment operation on the battery.

The drone may be configured to be capable of notifying the movable body of an amount of electricity to be stored in the battery necessary to fly on a planned traveling route determined in advance.

The drone may be configured to be capable of notifying the movable body of a remaining amount of electricity stored in the battery, and the movable body may be configured to determine whether to perform replenishment of the battery based on the remaining amount of electricity.

The movable body may be configured to be capable of notifying the drone reception section of an amount of electricity stored in the battery with which the drone can be replenished, via the movable body transmission section.

The drone may be configured to be capable of notifying the movable body of a required time to return to the takeoff-landing point.

The drone may be configured to be capable of predicting the number of times of suspension of an operation on a planned traveling route determined in advance and return to the takeoff-landing point, and to be capable of notifying the movable body of the predicted number of times.

The drone may be equipped with chemical agent that can be spread over a target area, the drone may be configured to be capable of performing replenishment of the chemical agent loaded in the drone at the takeoff-landing point, and the movable body may be configured to be capable of notifying the drone reception section of chemical-agent replenishment information indicating a status of a replenishment operation on the chemical agent.

The drone may be configured to be capable of notifying the movable body of a remaining amount of the chemical agent, and the movable body may be configured to determine whether to perform replenishment of the chemical agent based on the remaining amount of the chemical agent.

The movable body may be configured to be capable of notifying the drone reception section of an amount of the chemical agent being held with which the drone can be replenished, via the movable body transmission section.

The drone may be configured to be capable of notifying the movable body of an amount of chemical agent necessary to be spread over a target area.

The movable body may be configured to include a base station capable of transmitting and receiving a radio wave for determining positions of the movable body and the drone.

The movable body may be configured to be capable of notifying the drone reception section of information indicating that an anomaly occurs in the base station.

The movable body may be configured to be capable of notifying the drone reception section of a remaining amount of a driving energy content of the movable body, via the movable body transmission section.

The movable body may be configured to be capable of determining presence or absence of an obstacle present around the movable body and to be capable of notifying the drone reception section of information on the obstacle, via the movable body transmission section.

The movable body may be configured to further include an interrupting operation section that controls a flight of the drone.

The drone may be configured to be capable of notifying the movable body of anomaly information indicating that an anomaly occurs in the drone, and the interrupting operation section may be configured to operate a flight of the drone upon receiving the anomaly information from the drone.

The drone may be configured to be capable of notifying the movable body of a driving state of the drone.

A movable body according to an aspect of the present invention to achieve the objective described above is a movable body that is capable of moving with a drone aboard and allows the drone to make a takeoff and a landing, the movable body including: a takeoff-landing area on which the drone can be placed and that serves as a takeoff-landing point from and on which the drone takes off and lands; a movement control section capable of moving the movable body together with the drone aboard; and a movable body transmission section that sends information on the movable body, wherein the movable body receives, from the drone, a position of the takeoff-landing point at a time when the drone takes off.

A control method for a drone system according to an aspect of the present invention to achieve the objective described above is a control method for a drone system in which a drone and a movable body operate in coordination with each other, the movable body being capable of moving with the drone aboard and allowing the drone to make a takeoff and a landing, the movable body including: a takeoff-landing area on which the drone can be placed and that serves as a takeoff-landing point from and on which the drone takes off and lands; a movement control section capable of moving the movable body together with the drone aboard; and a movable body transmission section that sends information on the movable body, the drone including: a flight control section that causes the drone to fly; and a drone reception section that receives information on the movable body, the control method including a step of sending, to the movable body, a position of the takeoff-landing point at a time when the drone takes off.

A drone system control program according to an aspect of the present invention to achieve the objective described above is a control program for a drone system in which a drone and a movable body operate in coordination with each other, the movable body being capable of moving with the drone aboard and allowing the drone to make a takeoff and a landing, the movable body including: a takeoff-landing area on which the drone can be placed and that serves as a takeoff-landing point from and on which the drone takes off and lands; a movement control section capable of moving the movable body together with the drone aboard; and a movable body transmission section that sends information on the movable body, the drone including: a flight control section that causes the drone to fly; and a drone reception section that receives information on the movable body, the control program causing a computer to execute a command to send, to the movable body, a position of the takeoff-landing point at a time when the drone takes off.

Note that the computer program can be provided by download over a network such as the Internet or may be provided being recorded in one of various kinds of computer-readable recording media such as a CD-ROM.

A drone according to an aspect of the present invention to achieve the objective described above is a drone that is capable of being moved together with a movable body while being aboard the movable body, the drone including: a flight control section that causes the drone to fly; and a drone reception section that receives information on the movable body, wherein the drone sends, to the movable body, a position of the takeoff-landing point at a time when the drone takes off.

Advantageous Effect of Invention

The present invention enables operational coordination between a drone and a movable body that is capable of moving with the drone aboard and allows the drone to make a takeoff and a landing, so as to maintain a high safety even in an autonomous flight of the drone.

DESCRIPTION OF EMBODIMENTS

Embodiments for carrying out the invention of the present application will be described below with reference to the drawings. The drawings are all for exemplification purposes. In a detailed description to be made below, specific details will be described for explanation and for helping complete understanding of disclosed embodiments. However, embodiments are not limited to these specific details. In addition, well-known structures and devices are illustrated schematically for simplification of the drawings.

First, a configuration of a drone included in a drone system according to the present invention will be described. In the present specification, a drone refers generally to an aerial vehicle including a plurality of rotary wings irrespective of its type of motive power (electric motor, heat engine, etc.) and its type of control (wireless or wired, autonomous flight or manual control, etc.)

As illustrated in FIG. 1 to FIG. 5, rotary wings 101-1a, 101-1b, 101-2a, 101-2b, 101-3a, 101-3b, 101-4a, and 101-4b (also referred to as rotors) are means for causing a drone 100 to fly, and eight rotary wings (four sets of double-tier rotary wings) are provided, with consideration given to balance of stability of flight, a size of an airframe, and power consumption. The rotary wings 101 are arranged at positions in four directions from a main body 110 of the drone 100, supported by arms extending from the main body 110. That is, in a traveling direction of the drone 100, the rotary wings 101-1a and 101-1b are arranged behind the main body 110 on the left, the rotary wings 101-2a and 101-2b are arranged ahead of the main body 110 on the left, the rotary wings 101-3a and 101-3b are arranged behind the main body 110 on the right, and the rotary wings 101-4a and 101-4b are arranged ahead of the main body 110 on the right. Note that a traveling direction of the drone 100 is a downward direction of the paper of FIG. 1. Below the rotary wings 101, rod-shaped legs 107-1, 107-2, 107-3, and 107-4 extend along rotation axes of the rotary wings 101.

Figure 1:
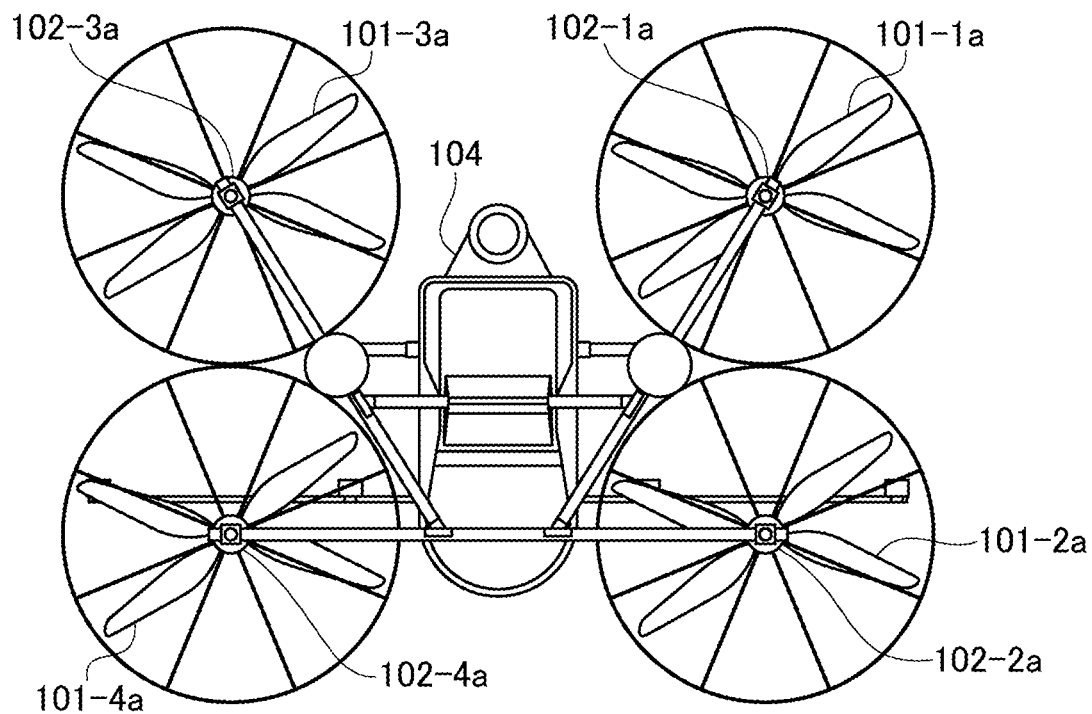
FIG. 1 is a plan view illustrating a first embodiment of a drone system according to the invention of the present application.
Figure 2:
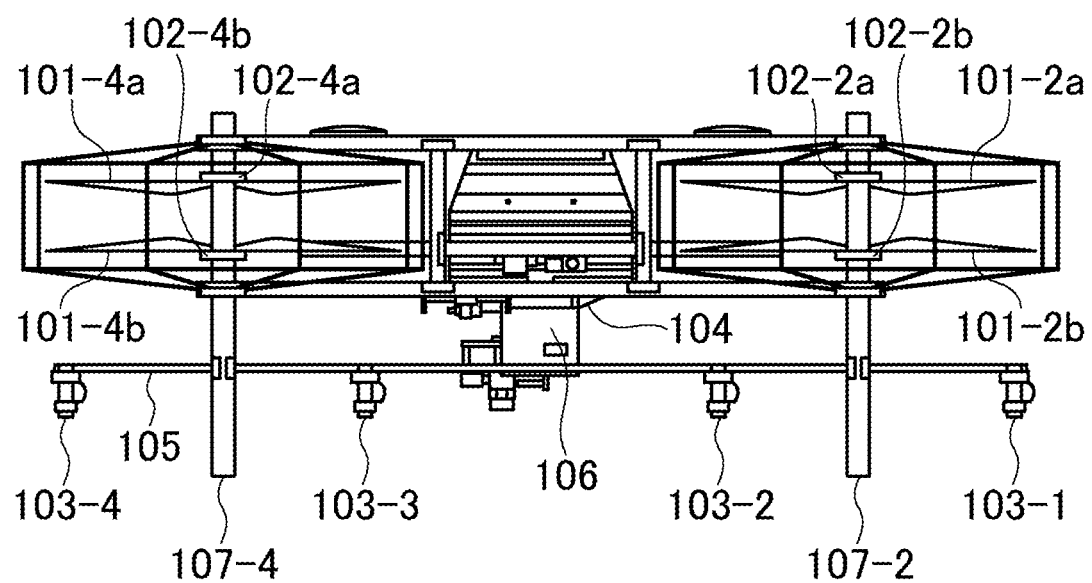
FIG. 2 is a front view of a drone included in the drone system.
Figure 3:
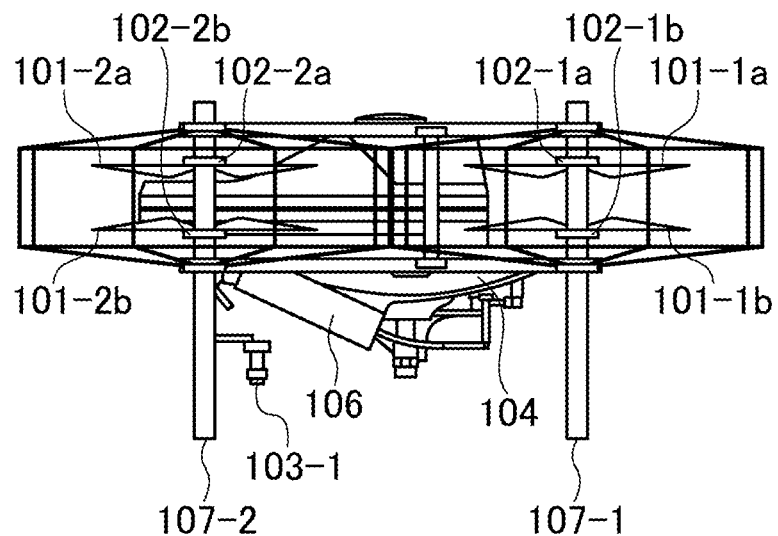
FIG. 3 is a right side view of the drone.
Figure 4:
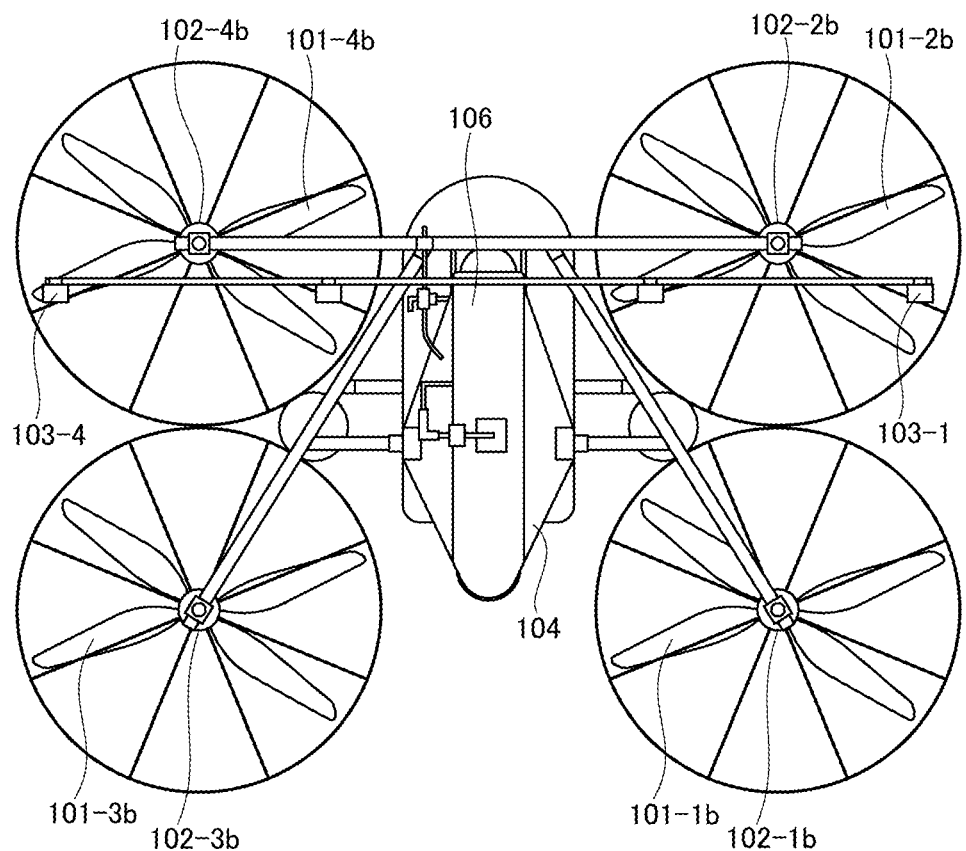
FIG. 4 is a rear view of the drone.
Figure 5:
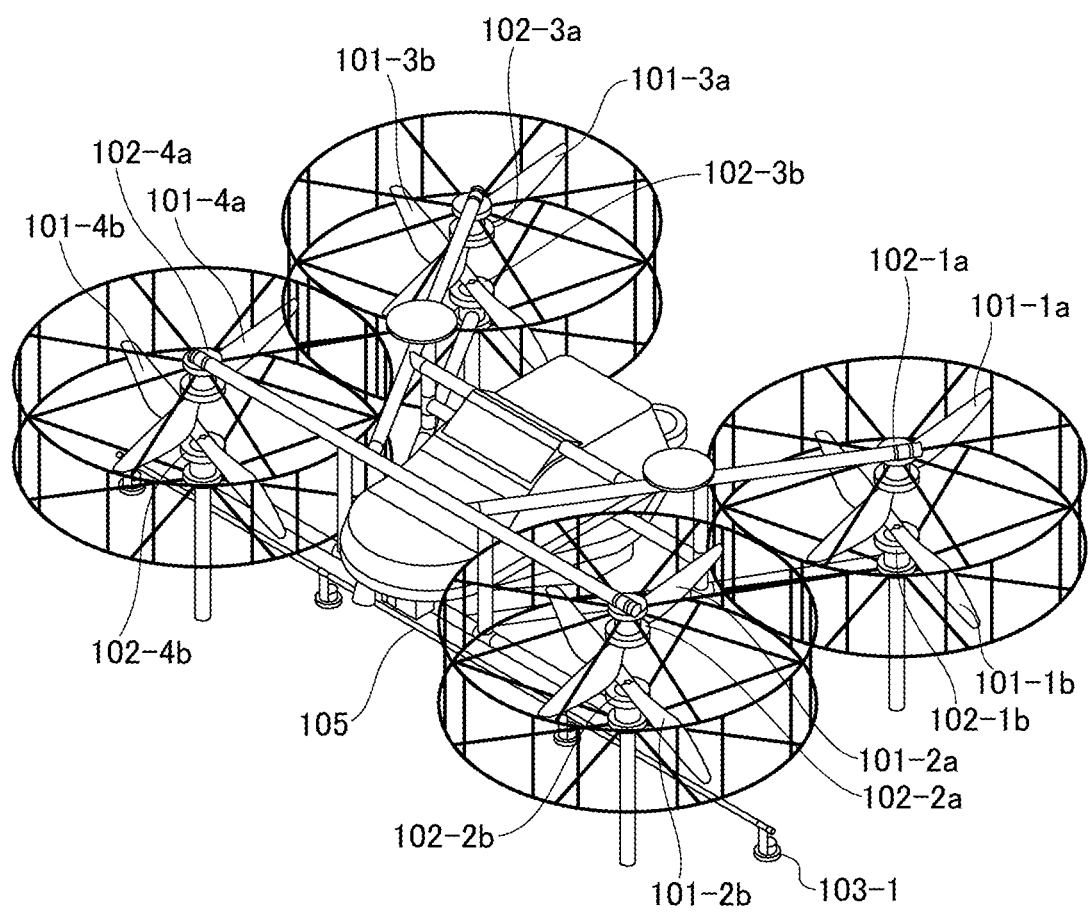
FIG. 5 is a perspective view of the drone.

Motors 102-1a, 102-1b, 102-2a, 102-2b, 102-3a, 102-3b, 102-4a, and 102-4b are means for causing the rotary wings 101-1a, 101-1b, 101-2a, 101-2b, 101-3a, 101-3b, 101-4a, and 101-4b to rotate (typically electric motors but may be engines, etc.), respectively, and are each provided for one rotary wing. The motors 102 are an example of thrusters. Up and down rotary wings of one of the sets (e.g., 101-1a and 101-1b) and their respective motors (e.g., 102-1a and 102-1b) include axes lying on the same line and rotate in directions opposite to each other for stability of flight and the like of the drone. As illustrated in FIG. 2 and FIG. 3, a radial members for supporting propeller guards, which are provided to prevent the rotors from interfering with a foreign object, each have a turreted structure rather than a horizontal structure. This is because, in a case of a collision, this structure urges the member to buckle outward of the rotary wing, preventing the member from interfering with the rotor.

Chemical agent nozzles 103-1, 103-2, 103-3, and 103-4 are means for spreading the chemical agent downward, and the number of the chemical agent nozzles provided is four. Note that, in the present specification, a chemical agent refers generally to liquid or powder to be spread over an agricultural field, such as agrochemical, herbicide, liquid fertilizer, insecticide, seeds, and water.

A chemical agent tank 104 is a tank for storing a chemical agent to be spread and is provided at a position close to and below a center of gravity of the drone 100, from a viewpoint of weight balance. Chemical agent hoses 105-1, 105-2, 105-3, and 105-4 are means for connecting the chemical agent tank 104 and the chemical agent nozzles 103-1, 103-2, 103-3, and 103-4, are made of a hard material, and may additionally play a role of supporting the chemical agent nozzles. A pump 106 is means for discharging the chemical agent from the nozzles.

Figure 6:
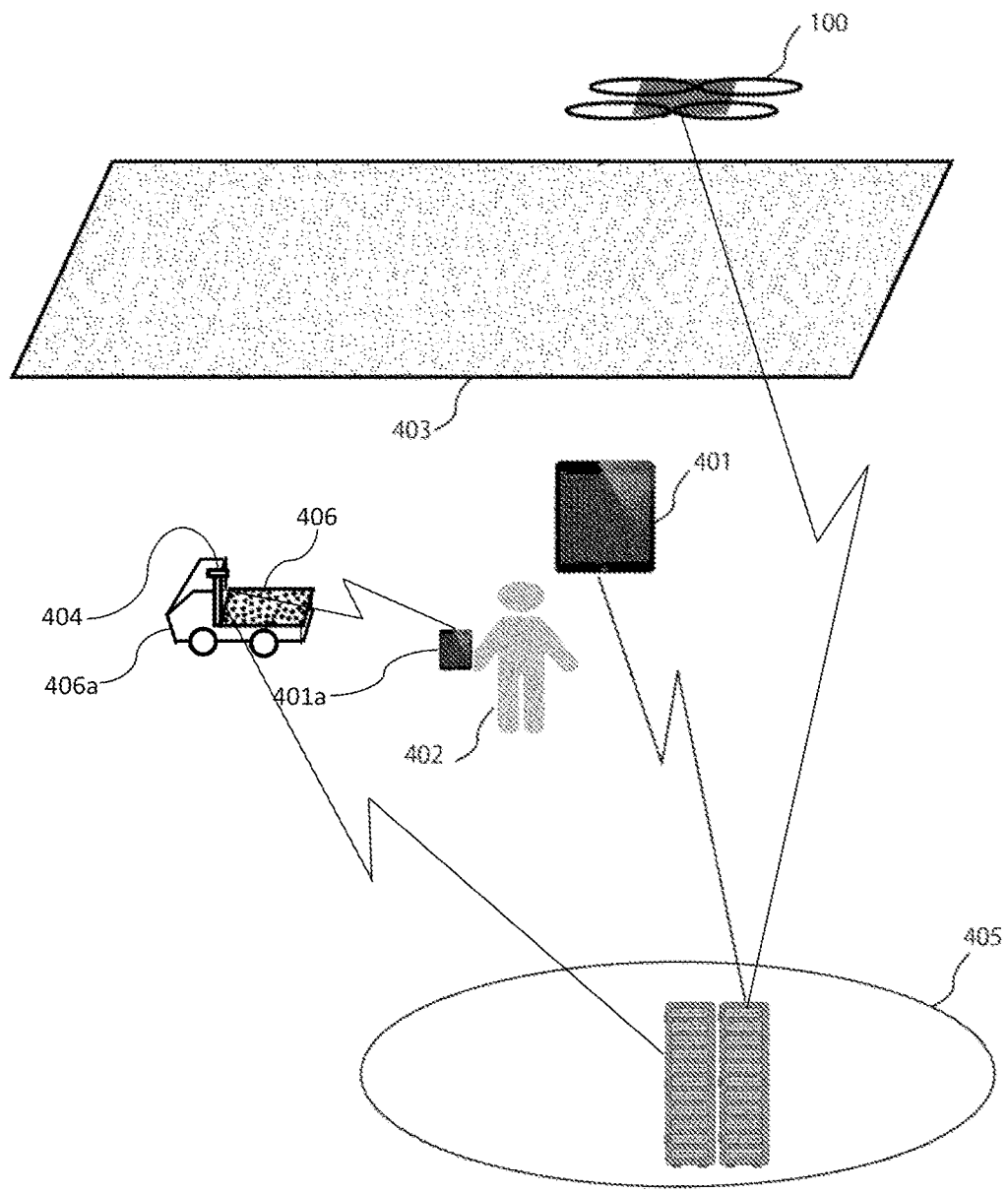
FIG. 6 is a general schematic diagram of a chemical-agent spreading system included in the drone.

FIG. 6 illustrates a general schematic diagram of a system to which an embodiment of the drone 100 according to the invention of the present application in chemical agent spreading use is applied. This figure is schematic, and its scale is not exact. In this figure, the drone 100, an operating device 401, and a base station 404 are connected to an agriculture cloud 405. A small portable terminal 401a is connected to the base station 404. These connection may be implemented by wireless communication such as Wi-Fi and a mobile telecommunications system, or may be partly and entirely implemented in a form of wired connection.

An operating device 401 is means for sending a command to the drone 100 in response to an operation made by a user 402 and for displaying information received from the drone 100 (e.g., position, amount of chemical agent, remaining battery level, image taken by a camera, etc.) and may be implemented in a form of mobile information equipment such as a typical tablet terminal on which a computer program runs. The drone 100 according to the invention of the present application is controlled so as to perform autonomous flight and may be configured to allow manual operation in basic operations such as a takeoff and a return and in an emergency situation. In addition to the mobile information equipment, an emergency operating device (not illustrated) having a dedicated function of making an emergency stop may be used (the emergency operating device may be dedicated equipment provided with a large emergency stop button or the like for dealing speedily with an emergency situation). Moreover, a small portable terminal 401a, a smartphone for example, capable of displaying some or all of pieces of information displayed on the operating device 401 may be included in the system in addition to the operating device 401. The system may have a function of changing behavior of the drone 100 based on information received from the small portable terminal 401a. The small portable terminal 401a is connected to, for example, the base station 404, being capable of receiving information and the like from the agriculture cloud 405 via the base station 404.

An agricultural field 403 is a rice field, field, or the like that is to be spread with the chemical agent by the drone 100. In reality, topographic features of the agricultural field 403 are complex, and there may be no topographic map that is available in advance, or a given topographic map may disagree with site conditions of the agricultural field 403. Usually, the agricultural field 403 is adjacent to a house, hospital, school, agricultural field of another crop, road, railroad, or the like. In the agricultural field 403, obstacles such as a building, an electric wire, or the like may be present.

The base station 404 is a device providing a master unit function in Wi-Fi communication and the like and may be configured to function also as an RTK-GPS base station to provide an accurate position of the drone 100 (the master unit function in the Wi-Fi communication and the RTK-GPS base station may be implemented in independent devices). The base station 404 may be capable of communicating mutually with the agriculture cloud 405 using a mobile telecommunications system such as 3G, 4G, and LTE. In the present embodiment, the base station 404 is loaded on a movable body 406a together with a takeoff-landing point 406.

An agriculture cloud 405 typically includes computers and relevant software operated on a cloud computing service and may be wirelessly connected to the operating device 401 with a mobile telephone line or the like. The agriculture cloud 405 may analyze images of the agricultural field 403 captured by the drone 100, grasp growth conditions of a crop, and perform processing for determining a flight route. In addition, the agriculture cloud 405 may provide topographic information and the like on the agricultural field 403 stored therein to the drone 100. Moreover, the agriculture cloud 405 may store the history of flights of the drone 100 and images captured by the drone 100 and perform various kinds of analyses thereon.

In general, the drone 100 takes off from the takeoff-landing point 406 located outside the agricultural field 403, spreads the chemical agent over the agricultural field 403, and returns to the takeoff-landing point 406 after the spreading or when replenishment of the chemical agent, electric recharging, or the like is needed. A flight route (entrance route) from the takeoff-landing point 406 to the agricultural field 403 as a destination may be stored in advance in the agriculture cloud 405 or the like or may be input by the user 402 before a takeoff.

Figure 7:
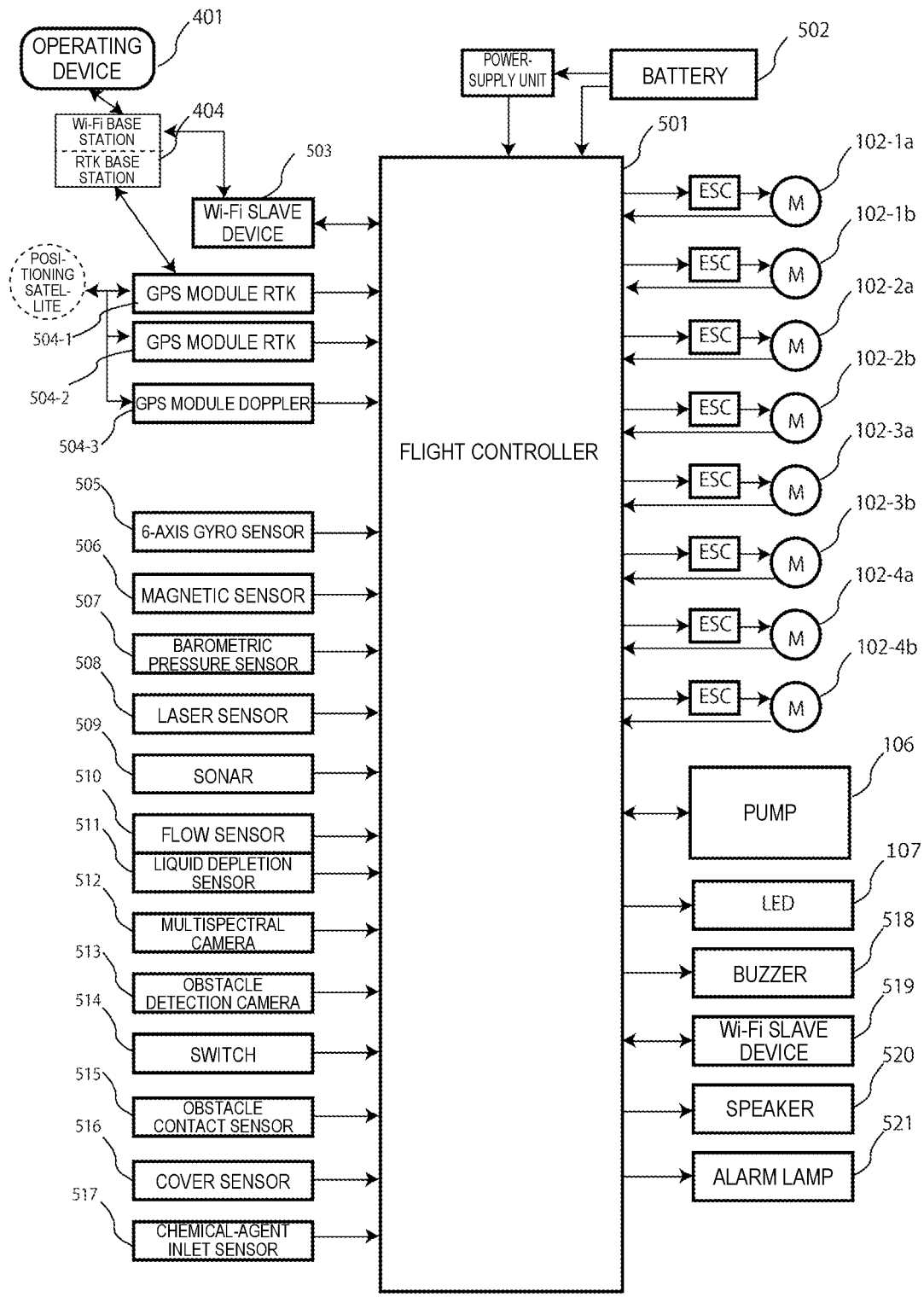
FIG. 7 is a schematic diagram illustrating control functions of the drone system.

FIG. 7 shows a block diagram illustrating control functions in an embodiment of a drone for spreading a chemical agent according to the invention of the present application. A flight controller 501 is a constituent component that governs control of the entire drone; specifically, the flight controller 501 may be an embedded computer including a CPU, a memory, relevant software, and the like. The flight controller 501 controls a flight of the drone 100 by controlling the numbers of revolutions of the motors 102-1a, 102-1b, 102-2a, 102-2b, 102-3a, 102-3b, 104-a, and 104-b via control means such as electronic speed controls (ESCs) based on input information received from the operating device 401 and input information obtained from various kinds of sensors described later. The flight controller 501 is configured to receive feedback on actual numbers of revolutions of the motors 102-1a, 102-1b, 102-2a, 102-2b, 102-3a, 102-3b, 104-a, and 104-b so as to monitor whether their rotations are normal. Alternatively, the flight controller 501 may be configured to receive feedback on the rotations of the rotary wings 101 from optical sensors or the like provided to the rotary wings 101.

Software used for the flight controller 501 can be rewritten for enhancement/modification of a function, fixing a problem, or the like via a storage medium or the like or communication means such as Wi-Fi communication and USB. In this case, the software is protected by encryption, checksum, digital signature, virus-check software, and the like so as not to be rewritten by fraudulent software. In addition, calculation processing used by the flight controller 501 for the control may be partly executed by the operating device 401 or another computer that is present on the agriculture cloud 405 or at another location. Some or all of the constituent components of the flight controller 501 may be duplexed owing to its great importance.

The flight controller 501 can receive a necessary command from the operating device 401 and send necessary information to the operating device 401 by communicating with the operating device 401 via a Wi-Fi slave unit function 503 and additionally the base station 404. In this case, the communication may be encrypted to prevent fraudulent activities such as interception, spoofing, and hacking a device. The base station 404 has a communication function using Wi-Fi as well as a function of an RTK-GPS base station. By combining signals from the RTK base station and signals from GPS satellites, an absolute position of the drone 100 can be measured with a precision of about several centimeters by the flight controller 501. The flight controller 501 may be duplexed/multiplexed owing to their great importance; in addition, redundant flight controllers 501 may be controlled to use different satellites so as to prepare for failure of some GPS satellites.

A 6-axis gyro sensor 505 is means for measuring accelerations of the drone airframe in three directions orthogonal to one another (additionally, means for calculating velocities by integrating the accelerations). The 6-axis gyro sensor 505 is means for measuring changes in attitude angles, namely, angular velocities, of the drone airframe in the three directions described above. A geomagnetic sensor 506 is means for measuring a direction of the drone airframe by measuring the Earth's magnetic field. A barometric pressure sensor 507 is means for measuring barometric pressure, and can also measure an altitude of the drone indirectly. A laser sensor 508 is means for measuring a distance between the drone airframe and the Earth's surface by using reflection of laser light, and may use infrared (IR) laser. A sonar 509 is means for measuring a distance between the drone airframe and the Earth's surface by using reflection of a sound wave such as an ultrasonic wave. These sensors and the like may be selected in accordance with a cost target and performance requirements of the drone. In addition, a gyro sensor (angular velocity sensor) for measuring an inclination of the airframe, an anemometer sensor for measuring a force of wind, and the like may be added. These sensors and the like may be duplexed or multiplexed. In a case where there are a plurality of sensors provided for the same purpose, the flight controller 501 may use only one of the sensors, and if a failure occurs in the one sensor, another one of the sensors may be switched to and used as an alternative sensor. Alternatively, the plurality of sensors may be used simultaneously, and it may be deemed that a failure occurs if measurement results from the sensors disagree.

Flow sensors 510 are means for measuring flow rates of the chemical agent and are provided at a plurality of locations on channels from the chemical agent tank 104 to the chemical agent nozzles 103. A liquid depletion sensor 511 is a sensor for sensing whether an amount of the chemical agent falls to or below a predetermined amount. A multispectral camera 512 is means for capturing the agricultural field 403 to acquire data to be used for image analysis. An obstacle detection camera 513 is a camera for detecting obstacles for the drone; the obstacle detection camera 513 is a device of a different kind from that of the multispectral camera 512 because its image properties and an orientation of its lens are different from those of the multispectral camera 512. A switch 514 is means with which the user 402 of the drone 100 makes various settings. An obstacle contact sensor 515 is a sensor for detecting that the drone 100, particularly a portion of its rotor or its propeller guard has come into contact with an obstacle such as an electric wire, a building, a human body, a tree, a bird, and another drone. A cover sensor 516 is a sensor for detecting that a cover of an operation panel or a cover for an internal maintenance of the drone 100 is in an open state. A chemical-agent inlet sensor 517 is a sensor for detecting that an inlet of the chemical agent tank 104 is in an open state. These sensors and the like may be selected in accordance with a cost target and performance requirements of the drone and may be duplexed or multiplexed. In addition, a sensor may be provided in the base station 404, the operating device 401, or another location outside of the drone 100, and information read by the sensor may be sent to the drone. For example, an anemometer sensor may be provided in the base station 404, and information on a force and a direction of wind may be sent to the drone 100 via Wi-Fi communication.

The flight controller 501 sends a control signal to the pump 106 to adjust an amount of the chemical agent to be discharged or stop discharging the chemical agent. The flight controller 501 is configured to receive feedback on current conditions (e.g., the number of revolutions) of the pump 106.

An LED 107 is display means for informing an operator of the drone of a state of the drone. In place of or in addition to the LED, display means such as a liquid crystal display may be used. A buzzer 518 is output means for indicating the state (particularly an error state) of the drone using an aural signal. A Wi-Fi slave unit function 519 is an optional constituent component that communicates with an external computer or the like to transfer, for example, software separately from the operating device 401. In place of or in addition to the Wi-Fi slave unit function, other kinds of wireless communication means such as infrared communication, Bluetooth®, ZigBee® and NFC, or wired communication means such as USB connection may be used. In place of the Wi-Fi slave unit function, a mobile telecommunications system such as 3G, 4G, and LTE may be used to enable the drone and the external computer to communicate with each other. A speaker 520 is output means for indicating the state (particularly an error state) of the drone using recorded human voice, synthesized voice, or the like. In some weather conditions, a visual display by the drone 100 during flight is difficult to see; in this case, using voice to transmit of the state is effective. An alarm lamp 521 is display means such as a strobe light for indicating the state (particularly an error state) of the drone. These kinds of input/output means may be selected in accordance with a cost target and performance requirements of the drone and may be duplexed or multiplexed.

Figure 10:
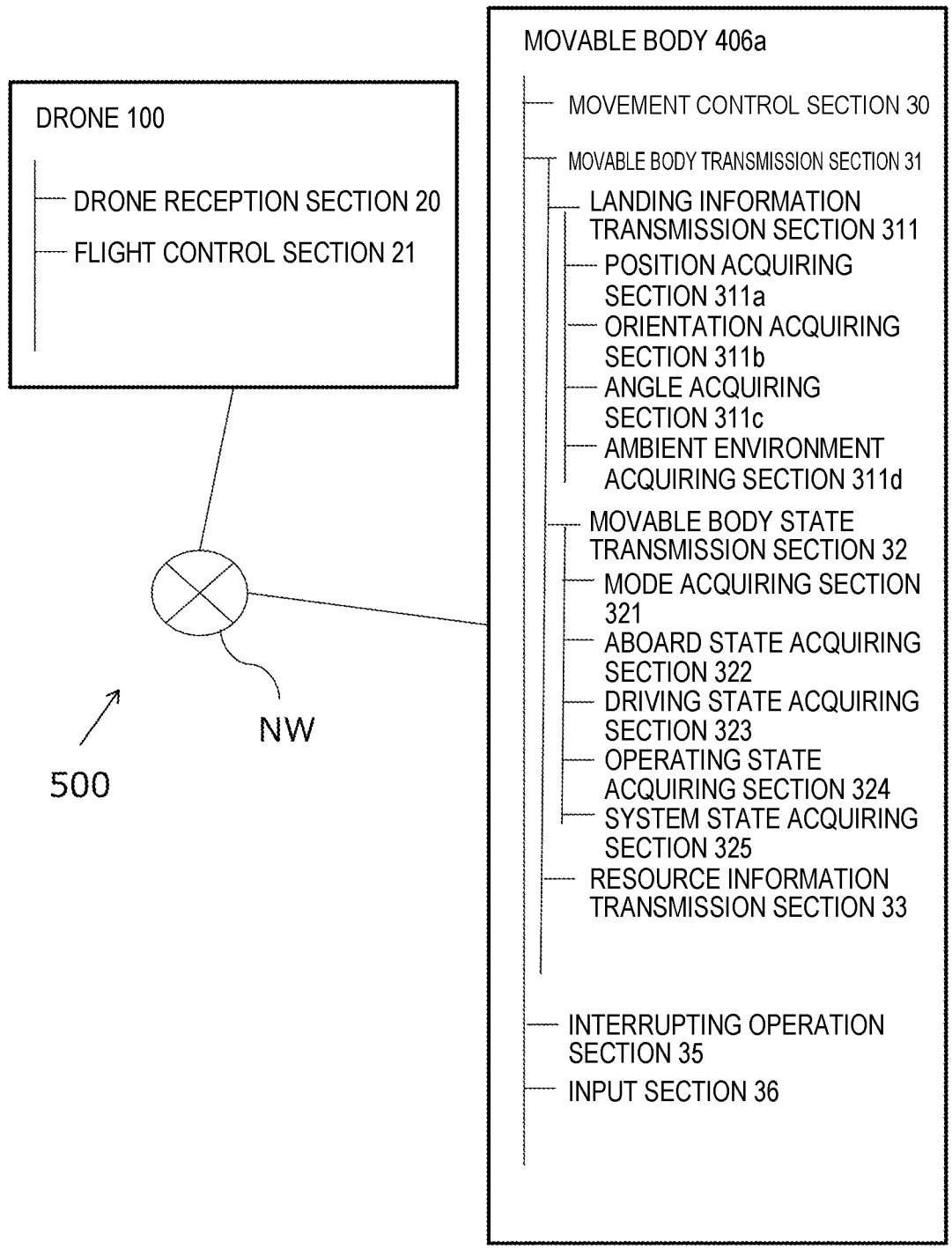
FIG. 10 is a functional block diagram of the drone and the movable body, the functional block diagram relating to an operation in which the movable body sends information, which is received by the drone.

As illustrated in FIG. 10, a drone system 500 is made up roughly of the drone 100 and a movable body 406a that are connected to each other over a network NW. The drone 100 and the movable body 406a exchange information with each other to operate in coordination with each other. On the movable body 406a, the takeoff-landing point 406 illustrated in FIG. 6 is formed. The drone 100 includes a flight control section 21 that controls the flight of the drone 100 and a functional section for exchanging information with the movable body 406a. Functional sections included in the drone 100 are implemented in, for example, the flight controller 501 illustrated in FIG. 7. Note that, in place of the configuration in which the drone 100 and the movable body 406a are connected to each other over the network NW, they may be connected to each other in a wired manner.

In addition to the drone 100 and the movable body 406a, the drone system 500 may include a portable terminal such as a smartphone. The portable terminal includes a display section that displays, as appropriate, information on an action predicted in relation to the operation of the drone 100, specifically, a planned time at which the drone 100 is to return to the takeoff-landing point 406 and information on details of operations to be performed by the user 402 when the drone 100 returns. Based on an input performed on the portable terminal, behavior of the drone 100 and the movable body 406a may be changed. The portable terminal is capable of receiving information from both the drone 100 and the movable body 406a. The information from the drone 100 may be sent to the portable terminal via the movable body 406a.

Configuration of Movable Body

Figure 8:
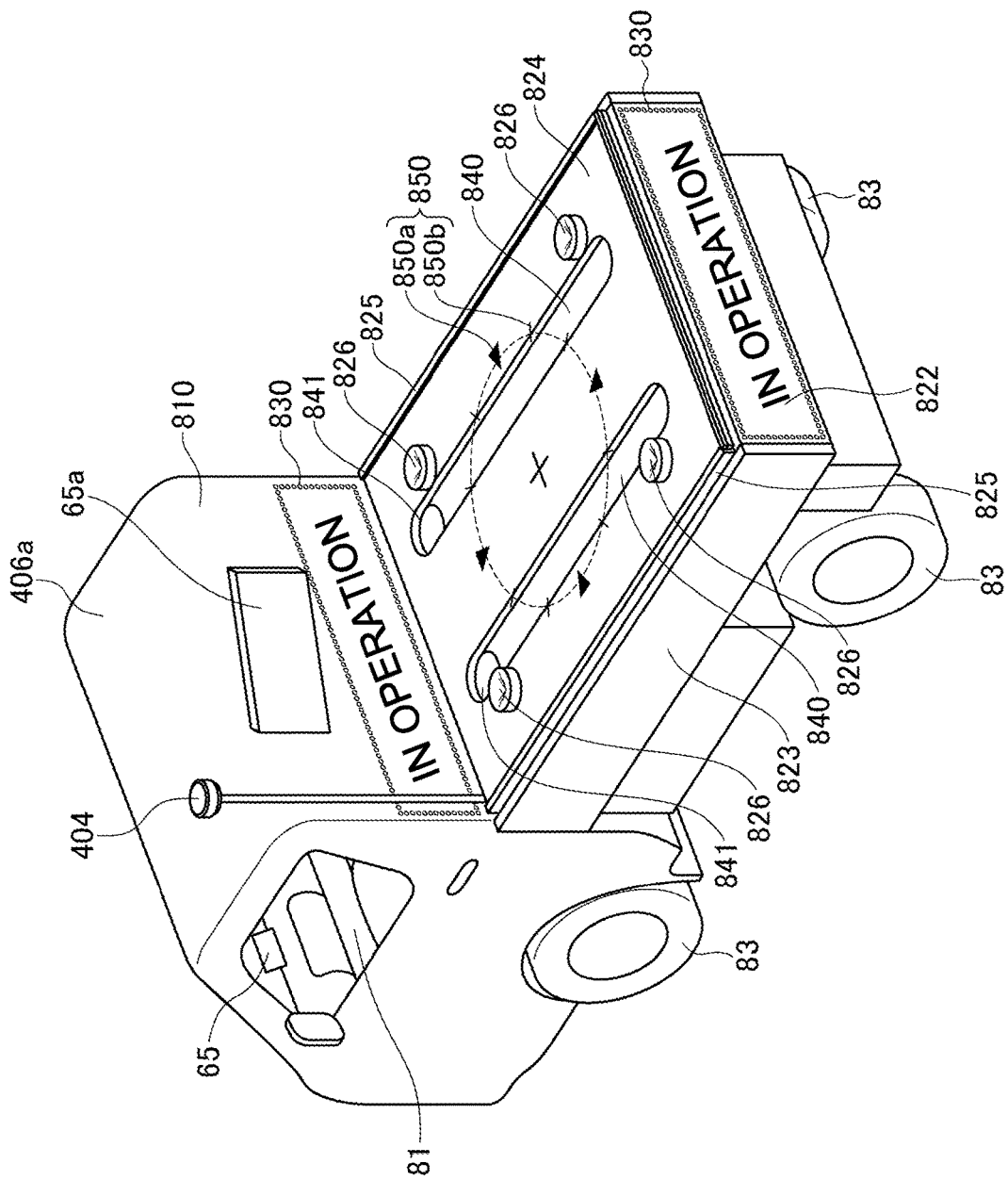
FIG. 8 is a schematic perspective view illustrating how the drone is placed on a movable body according to the invention of the present application.
Figure 9:
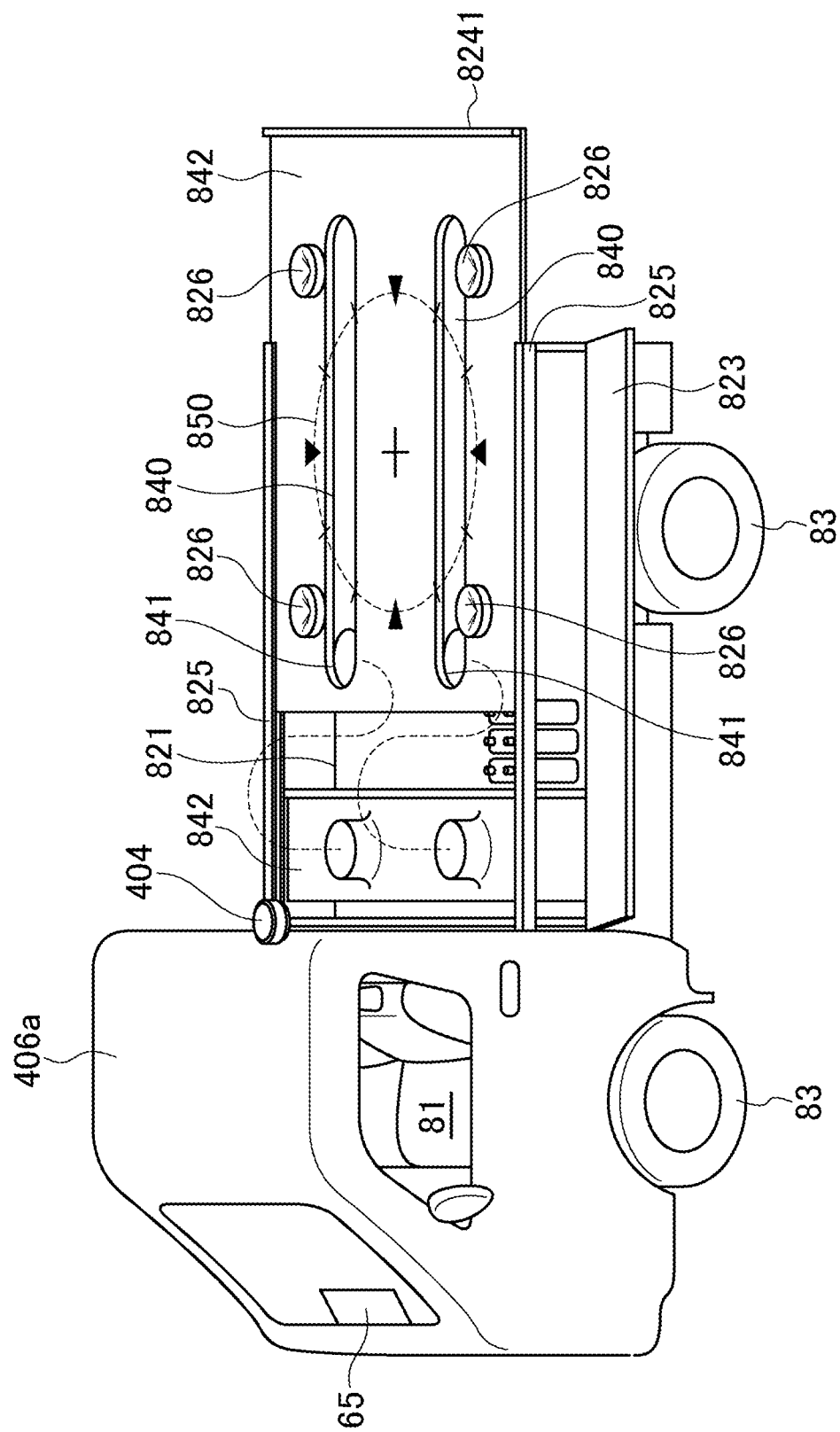
FIG. 9 is a schematic perspective view illustrating, in a state where the drone is placed on the movable body, how an upper plate on which the drone is placed is slid rearward.

The movable body 406a illustrated in FIG. 8 and FIG. 9 is an apparatus that receives information possessed by the drone 100 and notify the user 402 of the information as appropriate, and that accepts an input from the user 402 and sends the input to the drone 100. In addition, the movable body 406a is capable of moving with the drone 100 aboard. The movable body 406a is driven by the user 402 and may be capable of moving autonomously. Although the movable body 406a in the present embodiment is assumed to be a vehicle such as an automobile, more specifically a mini truck, the movable body 406a may be an appropriate land movable body such as a railroad car or may be a boat or an aerial vehicle. The movable body 406a may be driven by an appropriate driving source such as gasoline, electricity, and fuel cells.

The movable body 406a is a vehicle in which an occupant seat 81 is arranged on a front side of the vehicle in its traveling direction and a platform 82 on a rear side of the vehicle in the traveling direction. On a bottom side of the movable body 406a, four wheels 83 are arranged to be capable of being driven, as an example of moving means. The occupant seat 81 allows the user 402 to sit thereon. An upper face of the platform 82 serves as a takeoff-landing area being the takeoff-landing point for the drone 100.

In the vicinity of the occupant seat 81, a display section 65 that displays the movable body 406a and a state of the drone 100 is arranged. The display section 65 may be a device with a screen or may be implemented as a mechanism that projects information onto a windshield. In addition to the display section 65, a back-side display section 65a may be installed on a back side of a vehicle body 810 with which the occupant seat 81 is covered. With respect to the vehicle body 810, an angle of the back-side display section 65a can be changed laterally, and the user 402 working on a rear side or a lateral side of the platform 82 can acquire information by watching a screen of the back-side display section 65a.

At a front left corner of the platform 82 of the movable body 406a, the base station 404, which has a shape made by joining a disk-like member to an upper end of a round bar, extends upward to be higher than the occupant seat 81. Note that the base station 404 may have any shape and may be located at any position. With the configuration in which the base station 404 is located on the occupant seat 81 side of the platform 82, the base station 404 is unlikely to hinder the drone 100 from making a takeoff and a landing, as compared with a configuration in which the base station 404 is located on a rear side of the platform 82.

The platform 82 has a trunk 821 for storing a battery 502 for the drone 100 and chemical agent with which the chemical agent tank 104 of the drone 100 is to be replenished. The trunk 821 is a space surrounded by the vehicle body 810 with which the occupant seat 81 is covered, a rear plate 822, a pair of side plates 823 and 823, and an upper plate 824. The rear plate 822 and the side plates 823 are also called "gates". On upper portions of both edges of the rear plate 822, rails 825 are arranged, extending along upper edges of the side plates 823 up to the vehicle body 810 on the back side of the occupant seat 81. The upper plate 824 serves as the takeoff-landing point 406, which allows the drone 100 to be placed thereon and to make a takeoff and a landing; the upper plate 824 is slidable forward and backward in the traveling direction along the rails 825. The rails 825 serve as ribs that protrude upward from a plane of the upper plate 824, preventing the drone 100 placed on the upper plate 824 from slipping out of right and left edges of the movable body 406a. In addition, the rear side of the upper plate 824 is formed with a rib 8241 that protrudes upward to the same extent as the rails 825.

At an upper portion of the vehicle body 810 and on a rear side of the rear plate 822 in the traveling direction, an alarm lamp 830 displaying a notice of the drone system 500 being in operation may be arranged. The alarm lamp 830 may be a display that distinguishingly displays a notice of the drone 100 being in operation and a notice of the drone 100 being out of operation by using colors, turning on and off, or the like, or may be capable of displaying characters or pictures. The alarm lamp 830 at the upper portion of the vehicle body 810 may be capable of stretching up above the vehicle body 810 and providing a display on both sides of the alarm lamp 830. With this configuration, a warning can be visually recognized even when the drone 100 is placed on the platform 82. In addition, the warning can be visually recognized from ahead of the movable body 406a in the traveling direction.

The upper plate 824 may be manually slidable or may automatically slide by a rack-and-pinion mechanism or the like. After the upper plate 824 is slid rearward, an item can be put into the trunk 821 from above the platform 82 or can be taken out from the trunk 821. In a mode where the upper plate 824 is slid rearward, the upper plate 824 and the vehicle body 810 are sufficiently separated from each other, and thus the drone 100 can take off from and land on the takeoff-landing point 406.

On the upper plate 824, four leg receiving members 826 to which the legs of the drone 100 can be fixed are arranged. The leg receiving members 826 are, for example, disk-like members that are placed at positions corresponding to the four legs 107-1, 107-2, 107-3, and 107-4 of the drone 100, and each of which has an upper face that recesses in a truncated-cone shape. When landing on the leg receiving members 826, the legs 107-1, 107-2, 107-3, and 107-4 of the drone 100 slide on conical surfaces of the leg receiving members 826, so that tips of the legs 107-1, 107-2, 107-3, and 107-4 are guided to bottom portions of the truncated cones. The drone 100 can be fixed to the leg receiving members 826 automatically or manually by an appropriate mechanism, so that the movable body 406a can move with the drone 100 aboard to transport the drone 100, without excessively shaking the drone 100 or dropping the drone 100. The movable body 406a can sense whether the drone 100 is fixed to the leg receiving members 826 by using an aboard state acquiring section 322 to be described later.

Bottom portions of the leg receiving members 826 and the legs 107-1, 107-2, 107-3, and 107-4 of the drone 100 may be shaped such that each bottom portion and a corresponding leg fit together.

Substantially at a center portion of the upper plate 824, a circle light 850 that displays a guide to a takeoff-landing position for the drone 100 is arranged. The circle light 850 is formed with lamps that are arranged substantially in a circular pattern, and the lamps can each turn on and off individually. In the present embodiment, a circle light 850 is constituted of four large lamps 850a that are arranged every about 90 degrees on the circumference and small lamps 850b every two of which are arranged between adjacent large lamps 850a. The circle light 850 displays a flying direction after the drone 100 makes a takeoff or a flying direction in which the drone 100 makes a landing by lighting one or more of the lamps 850a and 850b. The circle light 850 may be constituted of one annular lamp that can partly turn on or off.

The pair of side plates 823 is coupled to the platform 82 at its bottom edges with hinges, by which the side plates 823 can be laid down outward. FIG. 9 illustrates how a side plate 823 on the left side in the traveling direction is laid down outward. After the side plate 823 is laid down outward, it is possible to put an item to be stored or take out a stored item through a lateral side of the movable body 406a. The side plates 823 can be fixed to be substantially parallel to a bottom face of the trunk 821, so that the side plates 823 are available as workbenches.

A pair of the rails 825 forms a mode switching mechanism. The hinges used to couple the side plates 823 to the platform 82 may be included in the mode switching mechanism. In a mode in which the upper plate 824 is arranged to cover above the trunk 821, and the side plates 823 are erected to cover lateral faces of the trunk 821, the movable body 406a moves. When the movable body 406a is at a stationary, the movable body 406a can be switched to a mode in which the upper plate 824 is slid rearward or a mode in which the side plates 823 are laid down, where the user 402 can approach an inside of the trunk 821.

While the drone 100 is on the takeoff-landing point 406, replenishment of a battery 502 can be performed. The replenishment of battery 502 includes charging of the battery 502 built in and replacing of the battery 502. In the trunk 821, a charging device for batteries 502 is stored and can charge batteries 502 stored in the trunk 821. Alternatively, the drone 100 may include a mechanism of an ultracapacitor in place of the battery 502, and a charger for the ultracapacitor may be stored in the trunk 821. In this configuration, while the drone 100 is fixed to the leg receiving members 826, the battery 502 equipped with the drone 100 can be fast-charged via the legs of the drone 100.

While the drone 100 is on the takeoff-landing point 406, the chemical agent tank 104 can be replenished with chemical agent to be reserved in the chemical agent tank 104. In the trunk 821, appropriate constituent components for dilution and mixing may be stored, such as a dilution-mixing tank for diluting and mixing chemical agent, a stirring mechanism, a pump and a hose for sucking the chemical agent from the dilution-mixing tank and pouring the chemical agent into the chemical agent tank 104. In addition, a replenishment hose that extends upward from the trunk 821 above the upper plate 824 and can be connected to an inlet of the chemical agent tank 104 may be provided.

On an upper-surface side of the upper plate 824, liquid-waste ditches 840 and liquid-waste holes 841 that guide chemical agent discharged from the chemical agent tank 104 are formed. The numbers of the liquid-waste ditches 840 and liquid-waste holes 841 arranged are each two, so that a liquid-waste ditch 840 is located below the chemical agent nozzles 103 irrespective of whether the drone 100 lands on the movable body 406a facing the right or the left. The liquid-waste ditches 840 are ditches with a predetermined width that are formed substantially straight, pass positions of the chemical agent nozzles 103, extend along a lengthwise direction of the movable body 406a, and are slightly inclined toward the occupant seat 81. At ends of the liquid-waste ditches 840 on the occupant seat 81 side, the liquid-waste holes 841 that penetrate the upper plate 824 to guide chemical solution into the inside of the trunk 821. The liquid-waste holes 841 communicate with a liquid-waste tank 842 that is installed inside the trunk 821 and substantially directly below the liquid-waste holes 841.

Before chemical agent is poured into the chemical agent tank 104, an air bleeding operation to discharge gas, mainly air, filling the chemical agent tank 104 to the outside is performed. At this time, an operation to discharge chemical agent from an outlet of the chemical agent tank 104 is needed. In addition, after the drone 100 completes its operation, an operation to discharge chemical agent from the chemical agent tank 104 is needed. With the configuration in which the upper plate 824 is formed with the liquid-waste ditches 840 and the liquid-waste holes 841, when chemical agent is poured into or discharged from the chemical agent tank 104 while the drone 100 is placed on the upper plate 824, liquid waste can be guided to the liquid-waste tank 842, so that the chemical agent can be poured and discharged safely.

Outline of Functional Blocks Included in Movable Body and Drone

Figure 11:
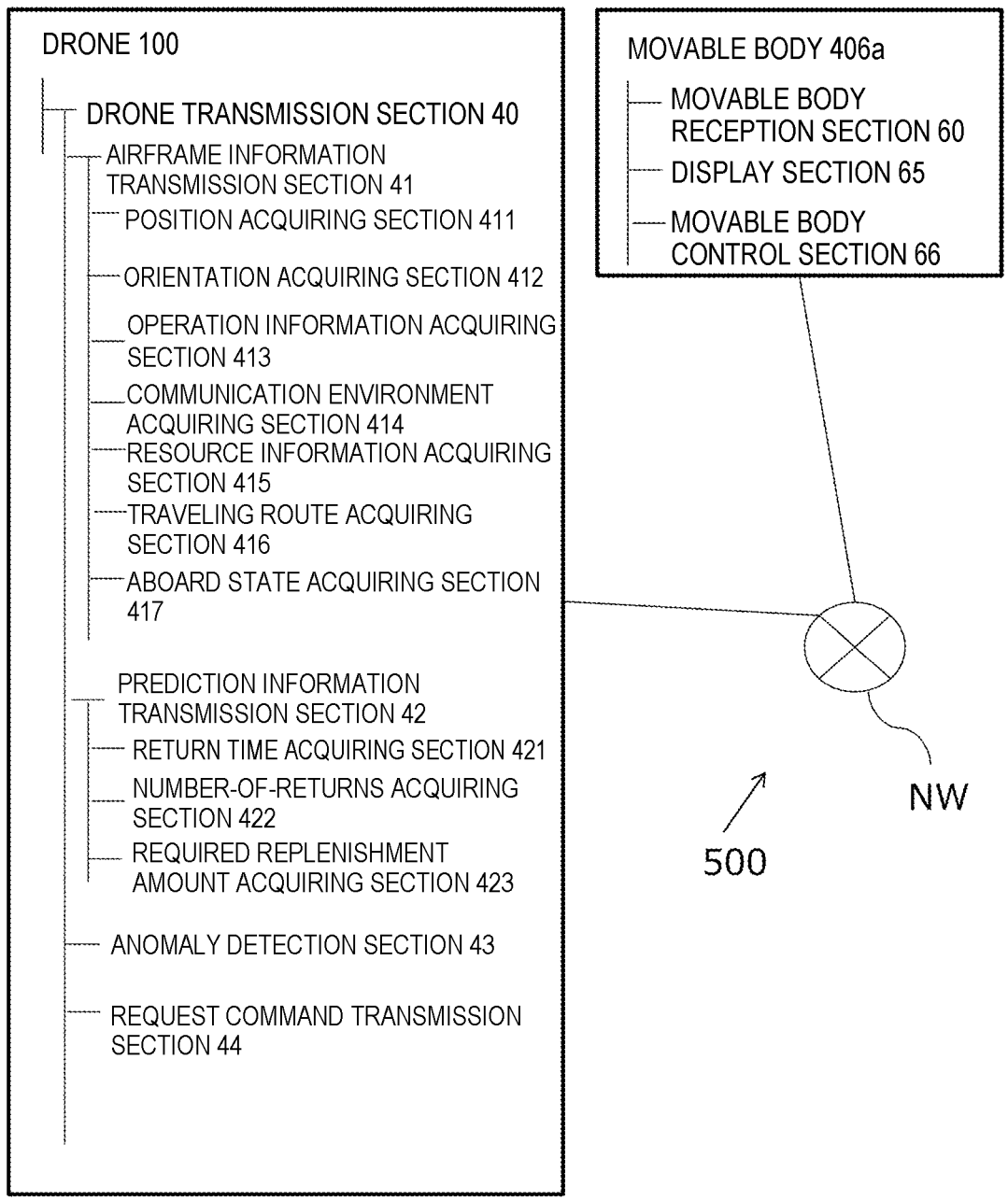
FIG. 11 is a functional block diagram of the drone and the movable body, the functional block diagram relating to an operation in which the drone sends information, which is received by the movable body.

As illustrated in FIG. 10, the movable body 406a includes a movement control section 30 as a constitutional component for movement of the movable body 406a itself. In addition, the movable body 406a includes a movable body transmission section 31, an interrupting operation section 35, and an input section 36 as constitutional components for acquiring information on the movable body 406a and sending the information to the drone 100. Moreover, as illustrated in FIG. 11, the movable body 406a includes a movable body reception section 60, the display section 65, and a movable body control section 66 as constitutional components for receiving information on the drone 100 from the drone 100, performing determination based on the information as appropriate, and notifying the user 402 of necessary information.

As illustrated in FIG. 10, the drone 100 includes the flight control section 21 that can autonomously control a flight of the drone 100. In addition, the drone 100 includes a drone reception section 20 as a constitutional component for receiving information from the movable body 406a. Moreover, as illustrated in FIG. 11, the drone 100 includes a drone transmission section 40 as a constitutional component for acquiring information on the drone 100 and sending the information to the movable body 406a.

Functional Blocks of Movable Body

As illustrated in FIG. 10, the movable body transmission section 31 includes a landing information transmission section 311, a movable body state transmission section 32, and a resource information transmission section 33.

The landing information transmission section 311 is a functional section that transfers information necessary for the drone 100 to land on the takeoff-landing point 406 of the movable body 406a to the drone reception section 20 of the drone 100. The landing information transmission section 311 includes a position acquiring section 311a, an orientation acquiring section 311b, an angle acquiring section 311c, and an ambient environment acquiring section 311d. The landing information transmission section 311 transfers the following kinds of information acquired by the position acquiring section 311a, the orientation acquiring section 311b, the angle acquiring section 311c, and the ambient environment acquiring section 311d to the drone reception section 20.

The position acquiring section 311a is a functional section that acquires position coordinates of the takeoff-landing point 406. The position coordinates are three-dimensional coordinates. When the movable body 406a is at a stationary, the position coordinates of the takeoff-landing point 406 are current position coordinates of the movable body 406a. When the movable body 406a moves, the position coordinates of the takeoff-landing point 406 may be coordinates that indicate a planned arrival position of the takeoff-landing point 406 at a time when the drone 100 arrives in a predetermined range in the vicinity of the takeoff-landing point 406.

The orientation acquiring section 311b is a functional section that acquires an orientation of the movable body 406a. To sense the orientation of the movable body 406a, the orientation acquiring section 311b may refer to a value from a magnetic field sensor included in the movable body 406a.

The angle acquiring section 311c is a functional section that acquires a roll angle and a pitch angle of the movable body 406a.

The ambient environment acquiring section 311d is a functional section that acquires information on an ambient environment that can be a hindrance to the drone 100 in landing on the takeoff-landing point 406; for example, the ambient environment acquiring section 311d acquires a force and a direction of wind, presence or absence of precipitation such as rain or snow. In addition, in a case where the takeoff-landing point 406 vibrates, the ambient environment acquiring section 311d acquires information on the vibration. The vibration of the takeoff-landing point 406 may be caused by earthquake or may be vibration that occurs close to a high-traffic road. The vibration of the takeoff-landing point 406 can be measured by a 6-axis gyro sensor included in the movable body 406a. The ambient environment acquiring section 311d may further acquire information on a satellite with which the RTK-GPS communicates, a state of the communication, and information on the Earth's magnetic field. When receiving the information from the ambient environment acquiring section 311d, the drone 100 determines appropriateness of a landing based on the information on the ambient environment.

In addition, the ambient environment acquiring section 311d detects obstacles that are present around the movable body 406a, as a kind of the information on the ambient environment. The obstacles are those that involve a risk of collision when the drone 100 makes a landing: examples of the obstacles include a structure such as a house, a guardrail, and an electric wire, a living thing such as a human and an animal, and a movable body such as a car. The ambient environment acquiring section 311d includes, for example, a visible-light camera or an infrared camera to detect the obstacles around the movable body 406a. For the detection of the obstacles can be performed, Rader/Lider can be used in place of or in addition to the camera; for example, an obstacle detection system that is commonly included in an automobile, an example of the movable body 406a, can be used. With this configuration, information on an obstacle that cannot be detected by the drone 100 can be transferred to the drone 100. It is thus possible to further reduce a risk that the drone 100 may collide with an obstacle.

Based on at least any one of the kinds of information acquired by the position acquiring section 311a, the orientation acquiring section 311b, the angle acquiring section 311c, and the ambient environment acquiring section 311d, the landing information transmission section 311 may determine whether the drone 100 can make a landing safely and may send a result of the determination to the drone reception section 20. This determination may be performed by the flight control section 21 of the drone 100.

The movable body state transmission section 32 is a functional section that transfers a state of the movable body 406a to the drone reception section 20. The movable body state transmission section 32 particularly acquires information on whether the movable body 406a is in a state of being capable of fulfilling functions as the takeoff-landing point 406 and transfers the information to the drone reception section 20. The functions as the takeoff-landing point 406 include being capable of allowing the drone 100 to take off from and land on the upper plate 824, being capable of performing replenishment of the battery 502 and the chemical solution of the drone 100, and the like.

The movable body state transmission section 32 includes a mode acquiring section 321, the aboard state acquiring section 322, a driving state acquiring section 323, an operating state acquiring section 324, and a system state acquiring section 325. The movable body state transmission section 32 transfers the following kinds of information acquired by the mode acquiring section 321, the aboard state acquiring section 322, the driving state acquiring section 323, the operating state acquiring section 324, and the system state acquiring section 325 to the drone reception section 20.

The mode acquiring section 321 is a functional section that acquires a mode of the movable body 406a. The movable body 406a can be switched at least to a traveling mode in which the movable body 406a moves and a takeoff-landing base mode in which the drone 100 takes off from and lands on the movable body 406a, by the mode switching mechanism described above. In the present embodiment, the movable body 406a can be switched also to a workbench mode in which the side plates 823 are laid down. The mode acquiring section 321 acquires information on which of the traveling mode, the takeoff-landing base mode, and the workbench mode the movable body 406a is in. The mode acquiring section 321 may acquire the mode of the movable body 406a based on a driving state of some component that drives the mode switching mechanism, such as a motor that drives the rack-and-pinion mechanism for the rails 825. The mode acquiring section 321 may include a component that mechanically senses the mode of the movable body 406a, such as a touch switch.

In the workbench state, there is a high probability of the user 402 being close to the movable body 406a, and thus the drone 100 cannot be caused to make a takeoff and a landing. Therefore, safety for the user 402 is guaranteed by the movable body transmission section 31 sending a signal of prohibiting the drone 100 from making a takeoff and a landing or a signal of permitting the drone 100 to make a takeoff and a landing to the drone reception section 20.

The aboard state acquiring section 322 is a functional section that acquires information on whether the drone 100 is aboard the takeoff-landing point 406. The aboard state acquiring section 322 can acquire information on whether the drone 100 is fixed to the takeoff-landing point 406, bringing the movable body 406a into a state of being capable of moving safely. Based on whether the movable body 406a is in the state of being capable of moving safely, the aboard state acquiring section 322 may determine whether to permit the movable body 406a to move or not and may transfer a result of the determination via the display section 65 to the user 402.

The driving state acquiring section 323 acquires driving information indicating whether the movable body 406a is moving or is in a state of being capable of moving. The driving state acquiring section 323 can acquire a driving state of the movable body 406a more in detail; whether the movable body 406a is moving or is stopping but in an idle state in which the movable body 406a can move can be distinguishingly acquired. In a state where the movable body 406a is immobile, the driving state acquiring section 323 can acquire a driving state of the movable body 406a more in detail; in addition to information on being stopping, the driving state acquiring section 323 may refer to information from the mode acquiring section 321 to obtain information on being in operation in the workbench mode or being changing the mode.

The operating state acquiring section 324 is a functional section that acquires states of a battery 502 and chemical solution with which the drone 100 is to be replenished. The operating state acquiring section 324 transfers battery replenishment information indicating a status of a replenishment operation of a battery 502, to the drone reception section 20. The battery replenishment information includes information on whether the movable body 406a is currently charging the battery 502 in the trunk 821, and information indicating any one of a state where a battery 502 is being prepared in the trunk 821 of the movable body 406a, a state where replacement of the battery 502 is being performed at the movable body 406a, and a state where the replacement has been completed. In addition, the operating state acquiring section 324 transfers chemical-agent replenishment information indicating a status of a replenishment operation of chemical agent, to the drone reception section 20. The chemical-agent replenishment information includes information indicating any one of a state where chemical agent is being prepared in the trunk 821, a state where replenishment of the chemical agent is being performed at the movable body 406a, and a state where the replenishment has been completed. In addition, the chemical-agent replenishment information includes information indicating a status of progress of dilution and mixing of the chemical agent performed in or close to the trunk 821.

The system state acquiring section 325 is a functional section that acquires information on a state in which a system included in the movable body 406a is (hereinafter, also referred to as a "system state"). Information on the system state includes information on presence or absence of an anomaly in the movable body 406a and information on presence or absence of an anomaly in the base station 404. The term "anomaly" used herein for the drone 100, the base station 404, and the movable body 406a covers an anomaly in an external environment as well as an internal anomaly.

For an anomaly in the movable body 406a, the information on the system state includes information on whether drone 100 should return immediately based on content of the anomaly occurring. This is because there is a case where the drone 100 need not return in a case where a degree of the anomaly in the movable body 406a is minor or in a case where the abnormal is of a kind of an anomaly that significant on the operation of the drone 100. A possible anomaly that requires the drone 100 to return is an anomaly such that fuel in the movable body 406a falls to or below a predetermined value. The information on the system state includes a remaining amount of a driving energy content of a driving source for driving the movable body 406a. In a case where a remaining amount of fuel for driving the movable body 406a is equal to or less than the predetermined value, the system state acquiring section 325 can issue a notification of the case. The movable body 406a may be driven by an appropriate driving source such as gasoline, electricity, and fuel cells.

Information indicating that an anomaly occurs in the base station 404 may be transferred from the movable body transmission section 31 to the drone reception section 20 or may be transferred from the base station 404 to the drone reception section 20 not via the movable body transmission section 31.

The resource information transmission section 33 is a functional section that sends resource information indicating amounts of resources prepared in the movable body 406a with which the drone 100 can be replenished, to the drone reception section 20. The resource information includes the number of charged batteries 502 and the amount of chemical agent. The resource information may include electricity to be charged with reserved in equipment for charging the batteries 502. In a case where the drone 100 is configured to be driven by fuel cells, the resource information may include an amount of fuel gas that can be reserved in the drone 100, such as hydrogen gas. The amounts of the resources prepared in the movable body 406a may be acquired through manual inputting by the user 402 or may be automatically acquired with some configuration. As the configuration of automatically acquiring the amounts of the resources, there may be a configuration of measuring a weight within a predetermined range of the trunk 821 to acquire the amount of chemical agent. For acquiring the number of charged batteries 502, there may be a configuration of measuring, in addition to the weight within the predetermined range of the trunk 821, capacities of the batteries 502.

The interrupting operation section 35 is a functional section that sends a command to control a flight of the drone 100 to the drone reception section 20. At normal times, the drone 100 automatically operates by the flight control section 21 included in the drone 100 itself; however, in a case where, for example, an anomaly occurs in the drone 100, a command from the movable body 406a interrupts the operation of the drone 100 to operate the drone 100. By using the input section 36 of the movable body 406a, a command from the user 402 can be transferred to the drone 100. In particular, in a case where the user 402 intends to stop the operation of the drone 100 and cause the drone 100 to return to the takeoff-landing point 406, the interrupting operation section 35 can send a command indicating the return to the drone 100. In addition, the interrupting operation section 35 may be capable of sending a signal to operate three-dimensional position coordinates, a speed, an acceleration, and a heading of the drone 100 individually, to the drone 100. The interrupting operation section 35 may be configured to start controlling a flight of the drone 100 upon receiving anomaly information from the drone 100.

The input section 36 is a functional section that receives an input from the user 402. The input section 36 can receive, for example, a command indicating that the drone 100 is to start a flight and a command indicating that the drone 100 is to return to the takeoff-landing point 406. The input section 36 may be a tablet that is implemented in a form of the same mechanism as that of the display section 65.

As illustrated in FIG. 11, the movable body 406a further includes the movable body reception section 60, the display section 65, and the movable body control section 66.

The movable body reception section 60 is a functional section that receives information from the drone transmission section 40. The information received by the movable body reception section 60 will be described later together with a description of functional blocks of the drone 100.

The display section 65 is a functional section that displays information to be transferred to the user 402 as appropriate.

The movable body control section 66 is a functional section that determines operation of the movable body 406a based on the information received by the movable body reception section 60. The operation of the movable body 406a includes an operation of determining whether to notify the user 402 and an operation of changing the mode of the movable body 406a. Operation of the movable body control section 66 will be described later in detail together with the information received by the movable body reception section 60 and the functional blocks of the drone 100.

Functional Blocks of Drone

As illustrated in FIG. 11, the drone transmission section 40 includes an airframe information transmission section 41, a prediction information transmission section 42, an anomaly detection section 43, and a request command transmission section 44.

The airframe information transmission section 41 is a functional section that sends information on a current status of the drone 100 to the movable body reception section 60. The airframe information transmission section 41 includes a position acquiring section 411, an orientation acquiring section 412, an operation information acquiring section 413, a communication environment acquiring section 414, a resource information acquiring section 415, a traveling route acquiring section 416, and an aboard state acquiring section 417.

The position acquiring section 411 is a functional section that acquires three-dimensional position coordinates of the drone 100. The three-dimensional position coordinates are acquired based on information from RTK-GPS. With this configuration, a current position of the drone 100 can be displayed on the display section 65. It is also possible to acquire the three-dimensional coordinates of the drone 100 while the drone 100 is on the takeoff-landing point 406 and retain the three-dimensional coordinates in the drone 100 itself and the movable body 406a as coordinates of a position at which the drone 100 can land. The drone 100 may be configured to determine a position to land at based on three-dimensional coordinates of the drone 100 at a time of landing. With this configuration, the configuration of the drone 100 can be used to acquire position coordinates of the takeoff-landing point 406 to be acquired for landing, which eliminates a need of installing a configuration of RTK-GPS in the movable body 406a, simplifying the configuration of the movable body 406a. In addition, the movable body control section 66 may be also capable of guiding the movable body 406a based on coordinates acquired when the drone 100 is on the takeoff-landing point 406 so that the drone 100 can return.

The orientation acquiring section 412 is a functional section that acquires a heading of the drone 100. The heading is acquired by referring to a value from a magnetic field sensor or a GPS compass installed in the drone 100.

The operation information acquiring section 413 is a functional section that acquires information on an operating state of the drone 100. The operating state of the drone 100 includes a state of taking off, a state landing, and a state of hovering to be standby. The operating state also includes a state of the drone 100 entering an agricultural field, and a state of the drone 100 flying outside the agricultural field.

The operating state further includes a state where the drone 100 is performing an operation such as spreading chemical agent and performing monitoring, and a state where the drone 100 does not perform the operation. The information on the operating state may be displayed on the display section 65 as appropriate. With this configuration, it is possible to inform the user 402 of a state of the drone 100 in automatic driving substantially in real time, giving the user 402 reassurance.

The communication environment acquiring section 414 is a functional section that acquires a state of communication with a satellite and a state of communication with a constitutional component included in the drone system 500 such as the movable body 406a.

The resource information acquiring section 415 is a functional section that acquires amounts of the resources loaded in the drone 100, that is, a remaining capacity of the battery 502 and a remaining amount of chemical agent in the chemical agent tank 104.

The traveling route acquiring section 416 is a functional section that acquires information on a predetermined traveling route of the drone 100 in the agricultural field. Based on the information on the traveling route, the drone 100 flies within the agricultural field to perform a predetermined operation such as monitoring and spreading of chemical agent. In addition, the traveling route acquiring section 416 may acquire information on an access route that connects the takeoff-landing point 406 and an access point through which the drone 100 enters and exits the agricultural field and may send the information via the drone transmission section 40, to the movable body 406a.

The aboard state acquiring section 417 is a functional section that acquires information on whether the drone 100 is aboard the movable body 406a. The aboard state acquiring section 417 may be capable of acquiring aboard information indicating whether the drone 100 is fixed to the takeoff-landing point 406 of the movable body 406a, bringing the movable body 406a into a state of being capable of moving safely. In a case where the drone 100 is safely fixed, the aboard state acquiring section 417 may send a signal that permits movement of the movable body 406a, via the drone transmission section 40 to the movable body 406a. In a case where the drone 100 is not fixed, the aboard state acquiring section 417 may send a signal that prohibits the movement of the movable body 406a, via the drone transmission section 40 to the movable body 406a.

The prediction information transmission section 42 is a functional section that predicts information on replenishment of the resources that is to be performed after the drone 100 returns to the takeoff-landing point 406 and sends the information to the movable body reception section 60. The prediction information transmission section 42 includes a return time acquiring section 421, a number-of-returns acquiring section 422, and a required replenishment amount acquiring section 423.

When the drone 100 is to complete an operation on a planned traveling route that is determined in advance in a target area such as an agricultural field, the return time acquiring section 421 is a functional section that calculates a required time taken by the drone 100 to reach an operation suspending point from which the drone 100 returns to the takeoff-landing point 406 for replenishment of resources after starting the operation. The return time acquiring section 421 may be capable of referring to the required time and a current time of day to acquire a planned time to suspend an operation and a planned time at which the drone 100 will return to the takeoff-landing point 406.

The number-of-returns acquiring section 422 is a functional section that acquires a planned number of returns of the drone 100 to the takeoff-landing point 406 for replenishment of the resources.

The required replenishment amount acquiring section 423 is a functional section that acquires amounts of the resources with which the drone 100 needs to be replenished. The amounts of the resources needed include, for example, the number of charged batteries and an amount of chemical agent. The number of charged batteries can be calculated with consideration given to a length of the planned traveling route, an actual value of past power consumption, and the like. The amount of chemical agent can be calculated based on a spreading density that is determined based on a total area of the agricultural field and a kind of the chemical agent.

The anomaly detection section 43 is a functional section that detects an anomaly occurring in the drone 100 and sends the anomaly via the drone transmission section 40 to the movable body reception section 60. In a case where an anomaly occurs in the drone 100, the drone 100 returns to the takeoff-landing point 406. Upon receiving the anomaly in the drone 100, the movable body control section 66 determines whether the movable body 406*a* is at a position and in a mode that allows the drone 100 to return thereto based on information from the anomaly detection section 43, and the movable body control section 66 changes the position or the mode of the movable body 406*a* as necessary. The movable body control section 66 notifies, via the display section 65, the user 402 that the position or the mode of the movable body 406*a* should be changed. The movable body control section 66 further notifies, via the display section 65, the user 402 that the user 402 should keep a certain distance from the movable body 406*a*.

The request command transmission section 44 is a functional section that sends a request command concerning a state of the movable body 406*a* to the movable body reception section 60. In particular, in a case where the drone 100 is to return, the request command transmission section 44 may send a request indicating that the position, the orientation, and the mode of the movable body 406*a* should be brought into a state that allows the drone 100 to land on the movable body 406*a*, to the movable body reception section 60. The movable body control section 66 may automatically make a change to bring about the state allowing the landing based on the request or may issue an appropriate notification to the user 402 to instruct the user 402 to bring about the state. In a case where the movable body 406*a* is in a state that allows the landing, the request command transmission section 44 may send a command to prohibit the movable body 406*a* from moving and a command to prohibit the movable body 406*a* from changing its mode.

Flowchart of Landing of Drone on Takeoff-Landing Point of Movable Body

Figure 12:
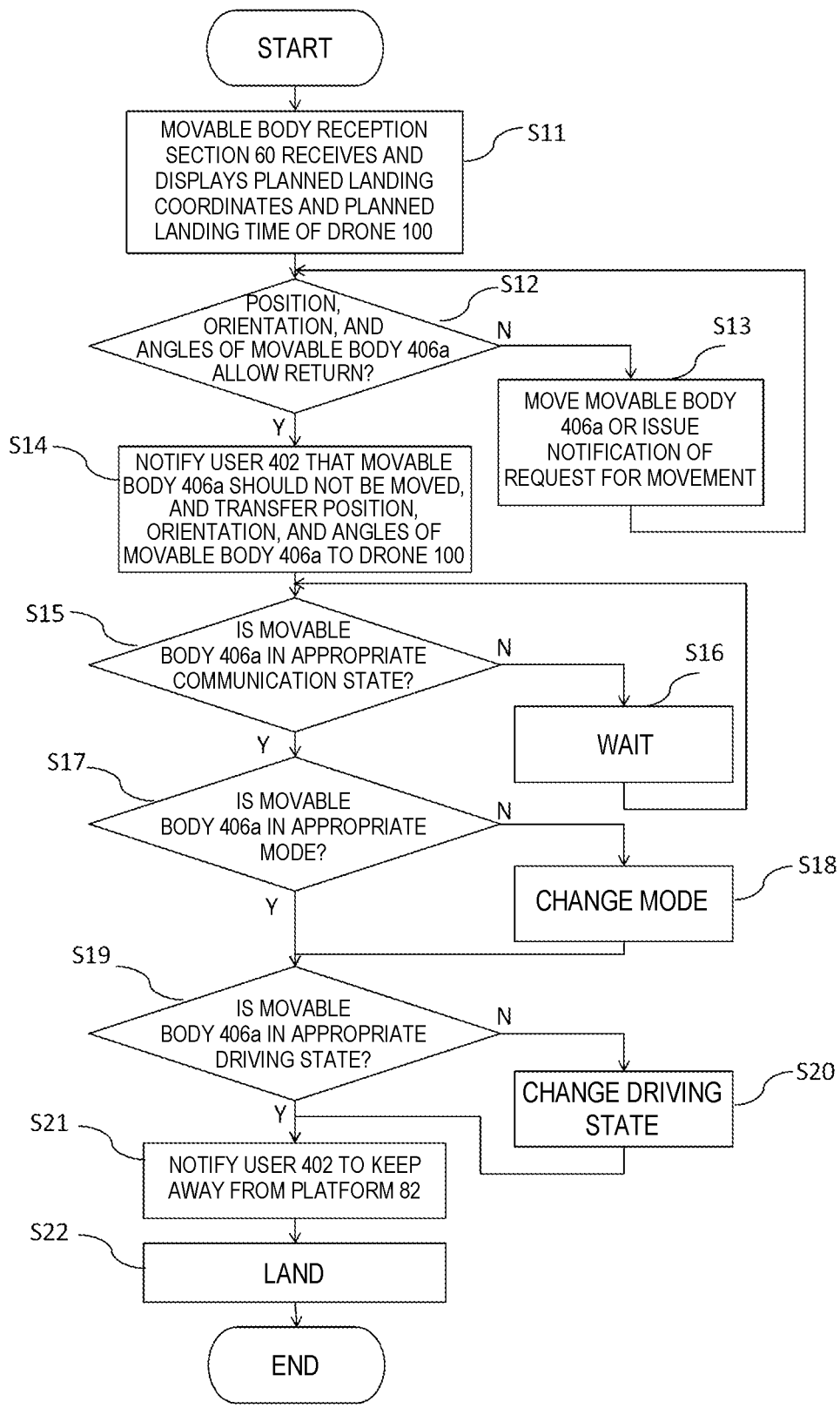
FIG. 12 is a flowchart illustrating a process of the drone landing on a takeoff-landing point on the movable body.

As illustrated in FIG. 12, first, the movable body reception section 60 receives planned landing coordinates, a heading, and a planned landing time of the drone 100 from the airframe information transmission section 41 and the prediction information transmission section 42 (S11).

The movable body control section 66 determines whether the position, the orientation, and the angles of the movable body 406*a* are within respective ranges that allow the drone 100 to return (S12). In a case where the position, the orientation, and the angles do not allow the drone 100 to return, the movable body control section 66 drives the movement control section 30 to move the movable body 406*a* such that its position, orientation, and angles allow the drone 100 to return (S13). Otherwise, the movable body control section 66 notifies, via the display section 65, the user 402 of a request for moving the movable body 406*a* and then returns to step S12.

In a case where the position, the orientation, and the angles of the movable body 406*a* are within the respective ranges that allow the drone 100 to return, the movable body control section 66 notifies, via the display section 65, the user 402 that the movable body 406*a* should not be moved (S14). In addition, the movable body control section 66 sends the position, the orientation, and the angles of the movable body 406*a* to the drone 100.

Next, the movable body control section 66 determines whether a state of communication with a satellite or another constitutional component of the drone system 500 acquired from the ambient environment acquiring section 311*d* is appropriate (S15). In a case where the state of communication is inappropriate, the movable body control section 66 waits a predetermined time period (S16). In addition, the movable body control section 66 notifies the user 402 that the movable body control section 66 is waiting due to the state of communication. The movable body control section 66 may be further configured to notify the user 402 of a planned time of the waiting. Instead of waiting, the movable body control section 66 may notify the user 402 of a request such as moving the position of the movable body 406*a*. Moving the movable body 406*a* is effective, in a case where the movable body 406*a* is located in the vicinity of a structure that causes electromagnetic interference or in a case where a position of a satellite to communicate with seen from the movable body 406*a* is mistakenly recognized.

Next, the movable body control section 66 determines whether the mode of the movable body 406*a* acquired by the mode acquiring section 321 is in a mode that allows the drone 100 to return (S17). In a case where the mode does not allow the drone 100 to return, the movable body control section 66 changes the mode of the drone 100 (S18). Alternatively, the movable body control section 66 may notify, via the display section 65, the user 402 that the user 402 should change the mode of the movable body 406*a*.

Next, the movable body control section 66 determines whether the driving state of the movable body 406*a* is in a state that allows the drone 100 to return (S19). In a case where the driving state does not allow the drone 100 to return, the movable body control section 66 changes the driving state (S20). Alternatively, the movable body control section 66 may notify, via the display section 65, the user 402 that the user 402 should change the driving state of the movable body 406*a*.

The display section 65 notifies the user 402 that the user 402 should keep away from the platform 82 because the drone 100 is to return (S21). The movable body control section 66 may be configured to give a permission for a landing to the drone 100 at this time after confirming that there are no persons nor obstacles around the movable body 406*a* based on information acquired by the ambient environment acquiring section 311*d*. After receiving the permission for a landing, the drone 100 lands on the takeoff-landing point 406 (S22).

Figure 13:
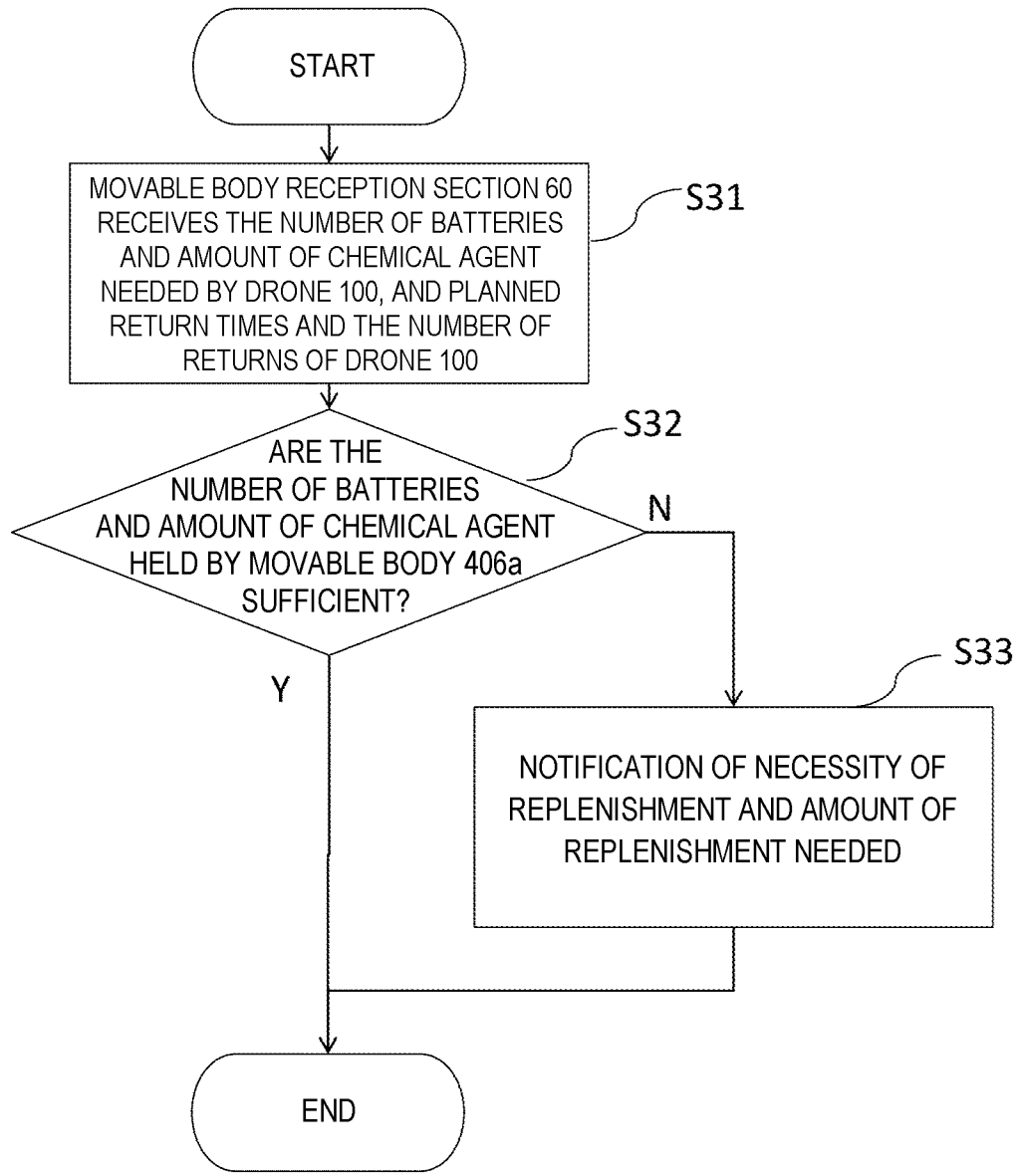
FIG. 13 is a flowchart illustrating a process of reserving amounts of resources held by the movable body based on information from the drone.

Flowchart of Management of Resources that are Held by Movable Body and with which Drone is to be Replenished As illustrated in FIG. 13, the movable body reception section 60 receives information on the number of batteries 502 and an amount of chemical agent that are needed by the drone 100, and planned return times, the number of returns, and the like of the drone 100, from the prediction information transmission section 42 of the drone 100 (S31). The movable body control section 66 refers to the amounts of the resources acquired by the resource information transmission section 33 and determines whether the number of batteries 502 and the amount of chemical agent held by the movable body 406a are sufficient (S32). In a case where the number of batteries 502 or the amount of chemical agent held by the movable body 406a is insufficient, the movable body control section 66 notifies the user 402 of necessity of replenishment and an amount of the replenishment needed (S33). The movable body control section 66 may notify the user 402 of an amount necessary by the next return and a total amount necessary by the completion of an operation on the agricultural field separately.

Flowchart in the Case where Anomaly Occurs in Drone

Figure 14:
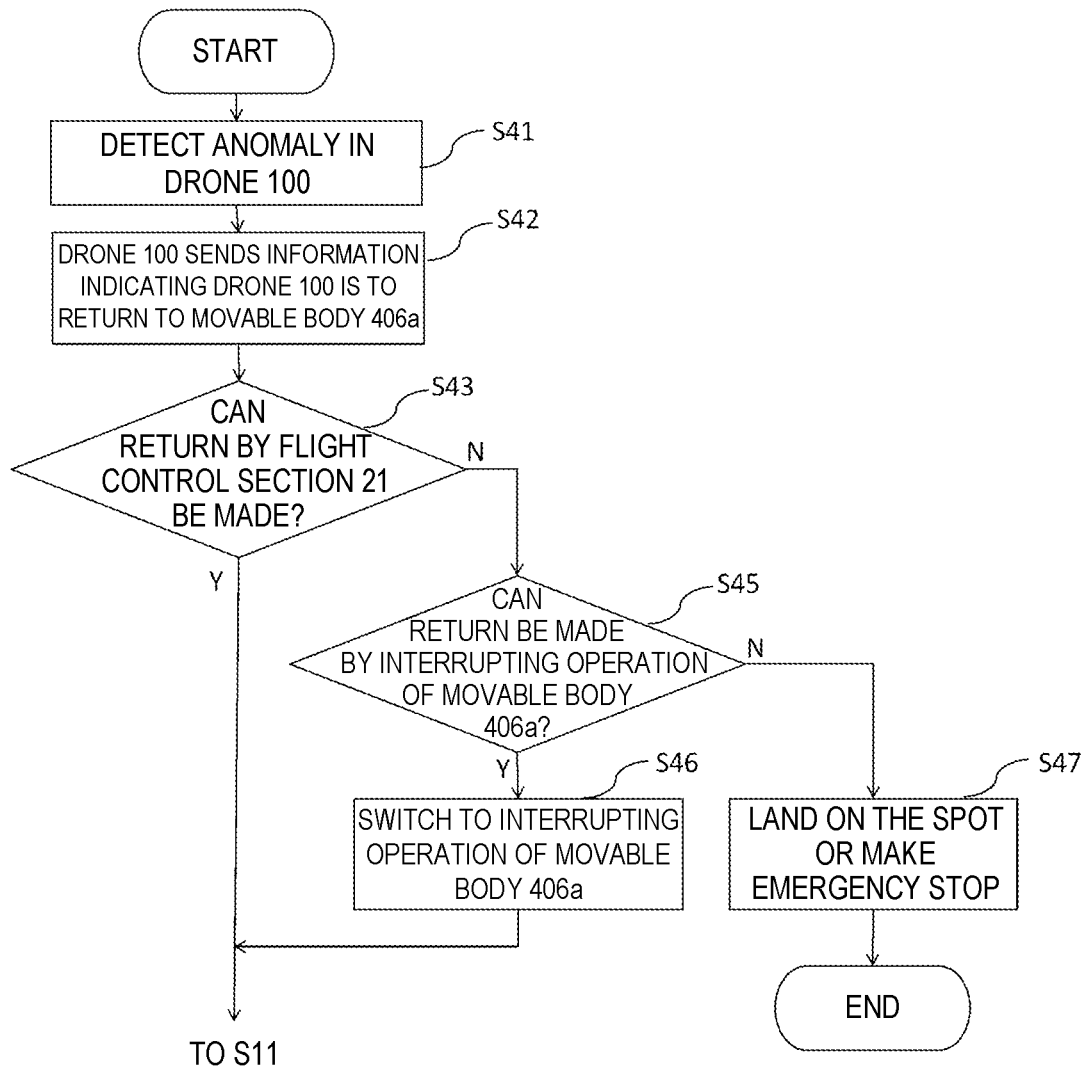
FIG. 14 is a flowchart of a process performed when an anomaly is detected in the drone.

As illustrated in FIG. 14, first, the anomaly detection section 43 of the drone 100 detects an anomaly (S41). Next, the drone transmission section 40 sends information indicating that the drone 100 is to return to the movable body 406a, to the movable body reception section 60 (S42).

The flight control section 21 of the drone 100 determines whether the return can be made under control by the flight control section 21 itself (S43), and in a case where the return can be made, the flight control section 21 proceeds to step S11 in FIG. 12, determining to make the return by itself.

In a case where it is determined that the return cannot be made under the control by the flight control section 21 itself, the movable body control section 66 determines whether the drone 100 can return by an interrupting operation performed by the interrupting operation section 35 of the movable body 406a (S45). In a case where the return can be made, the movable body control section 66 makes a switch to the interrupting operation by the movable body 406a (S46) and proceeds to step S11 in FIG. 12. In step S45, in a case where the return cannot be made even by the interrupting operation, the drone 100 lands on the spot or makes an emergency stop such as stopping operation of the rotary wings to drop on the spot (S47).

Flowchart in the Case where Anomaly Occurs in Movable Body

Figure 15:
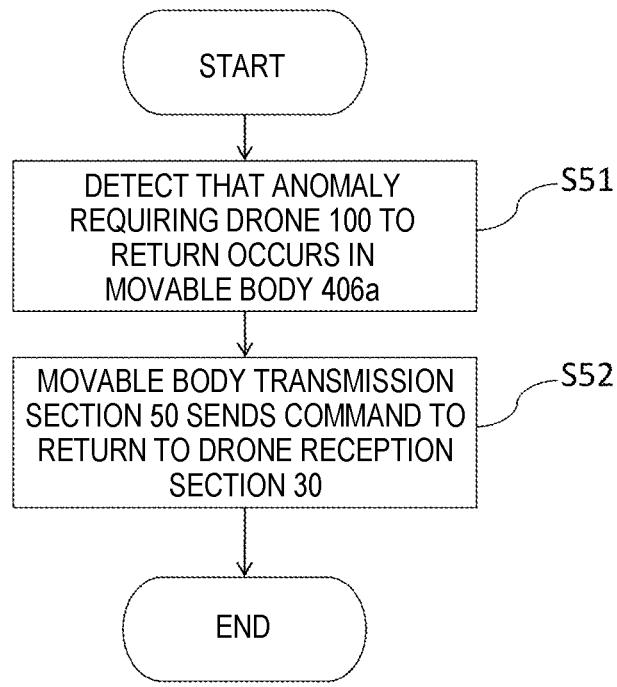
FIG. 15 is a flowchart of a process performed when an anomaly is detected in the movable body.

As illustrated in FIG. 15, first, the system state acquiring section 325 of the movable body 406a detects that an anomaly that requires the drone 100 to return occurs in the movable body 406a (S51). Next, the movable body transmission section 31 sends, to the drone reception section 20, a command to cause the drone 100 to return (S52).

Movable Body (2)

Figure 16:
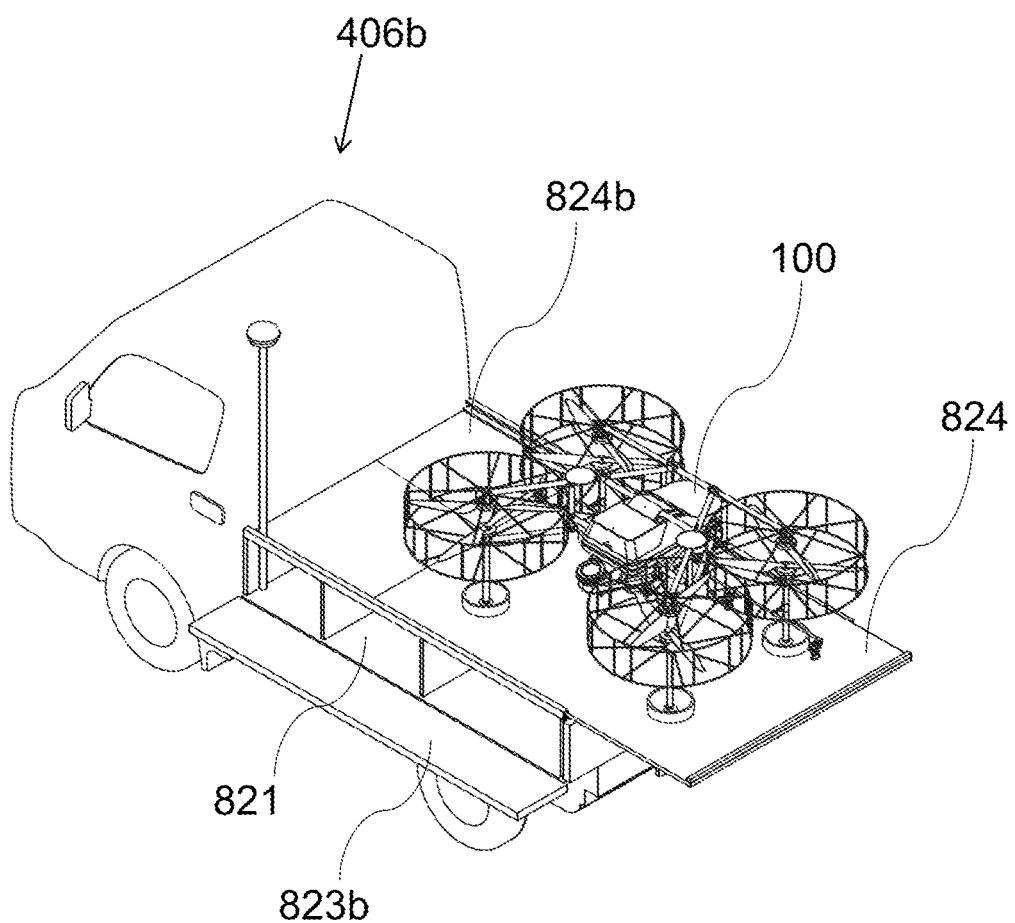
FIG. 16 is a general schematic diagram illustrating a scene of a movable body according to a second embodiment of the invention of the present application and the drone.

Referring to FIG. 16, a second embodiment of the movable body according to the present invention will be described focusing on differences from the embodiment described above. Hereinafter, the same constituent components as those in the other embodiments will be denoted by the same reference characters. A movable body 406b in the second embodiment is different from the movable body in the first embodiment in that a second upper plate 824b is arranged below the upper plate 824. With this configuration, the inside of the trunk 821 will not be opened above even after the upper plate 824 is slid, so that loaded items can be protected. In the movable body 406b, gates 823b on lateral sides are coupled at their lower edges to edge portions of the trunk 821 with hinges, so that the gates 823b can be laid down and fixed to be substantially parallel to a bottom face of the trunk 821. With this configuration, loaded items inside the trunk 821 can be approached, and in addition, the gates 823b are also available as workbenches.

Movable Body (3)

Figure 17:
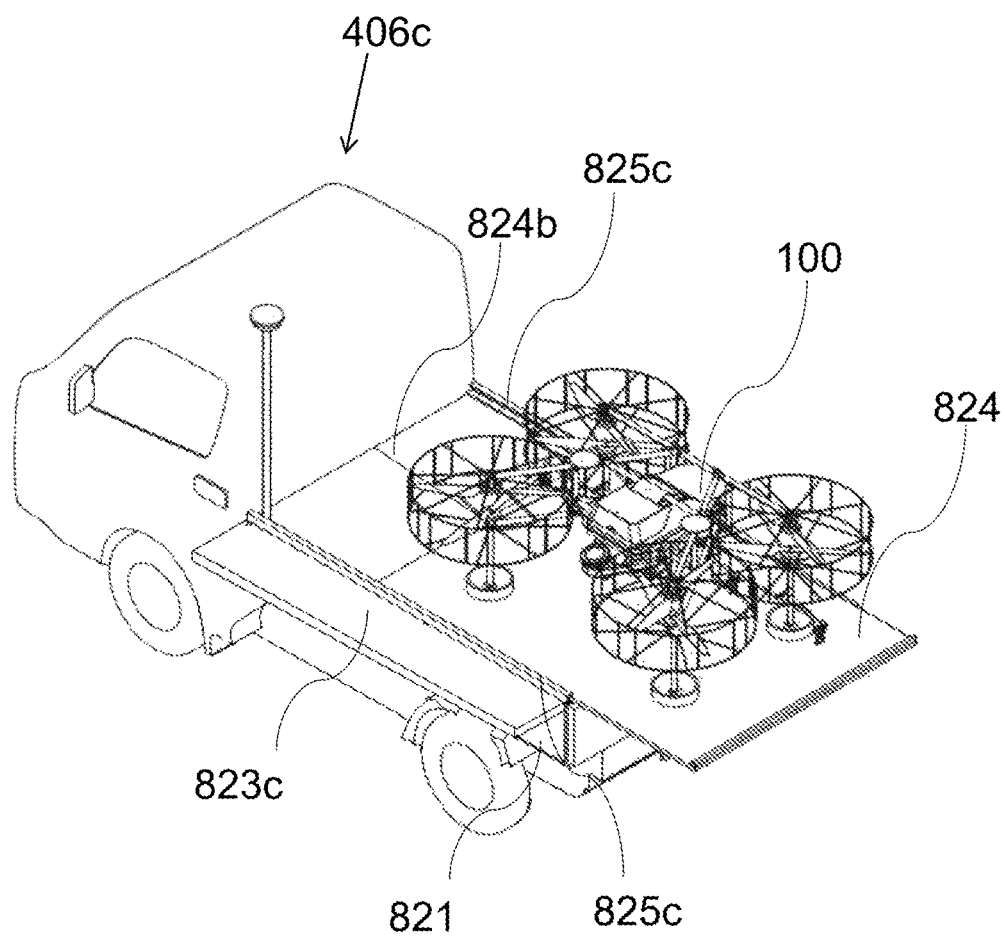
FIG. 17 is a general schematic diagram illustrating a scene of a movable body according to a third embodiment of the invention of the present application and the drone.

Referring to FIG. 17, a third embodiment of the movable body according to the present invention will be described focusing on differences from the embodiment described above. A movable body 406c in the third embodiment is different from the movable body in the first embodiment in that upper edges of gates 823c on lateral sides are coupled to rails 825c with hinges, so that the gates 823c can be pivoted and fixed to be substantially parallel to the upper plate 824. With this configuration, the gates 823c can expand a surface for landing. In addition, in the present embodiment, the second upper plate 824a is arranged.

Movable Body (4)

Figure 18:
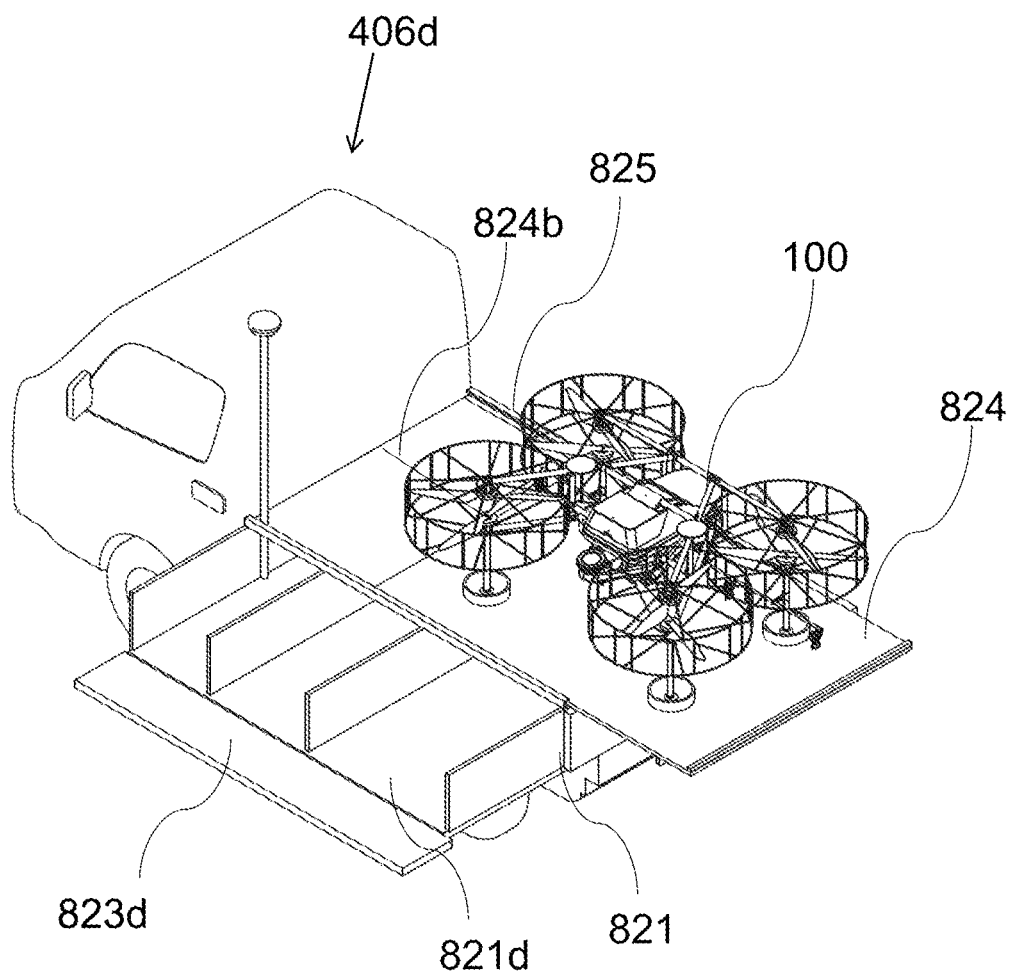
FIG. 18 is a general schematic diagram illustrating a scene of a movable body according to a fourth embodiment of the invention of the present application and the drone.

Referring to FIG. 18, a fourth embodiment of the movable body according to the present invention will be described focusing on differences from the embodiment described above. A movable body 406d in the fourth embodiment has a nested structure in which a slidable trunk 821d is housed in the trunk 821, and lower edges of gates 823d are coupled to the slidable trunk 821d with hinges, so that the gates 823d and the slidable trunk 821d can be drawn sideward from below the upper plate 824. With this configuration, loaded items can be drawn together with the slidable trunk 821d, which improves workability. In addition, in the present embodiment, the second upper plate 824a is arranged.

Movable Body (5)

Figure 19:
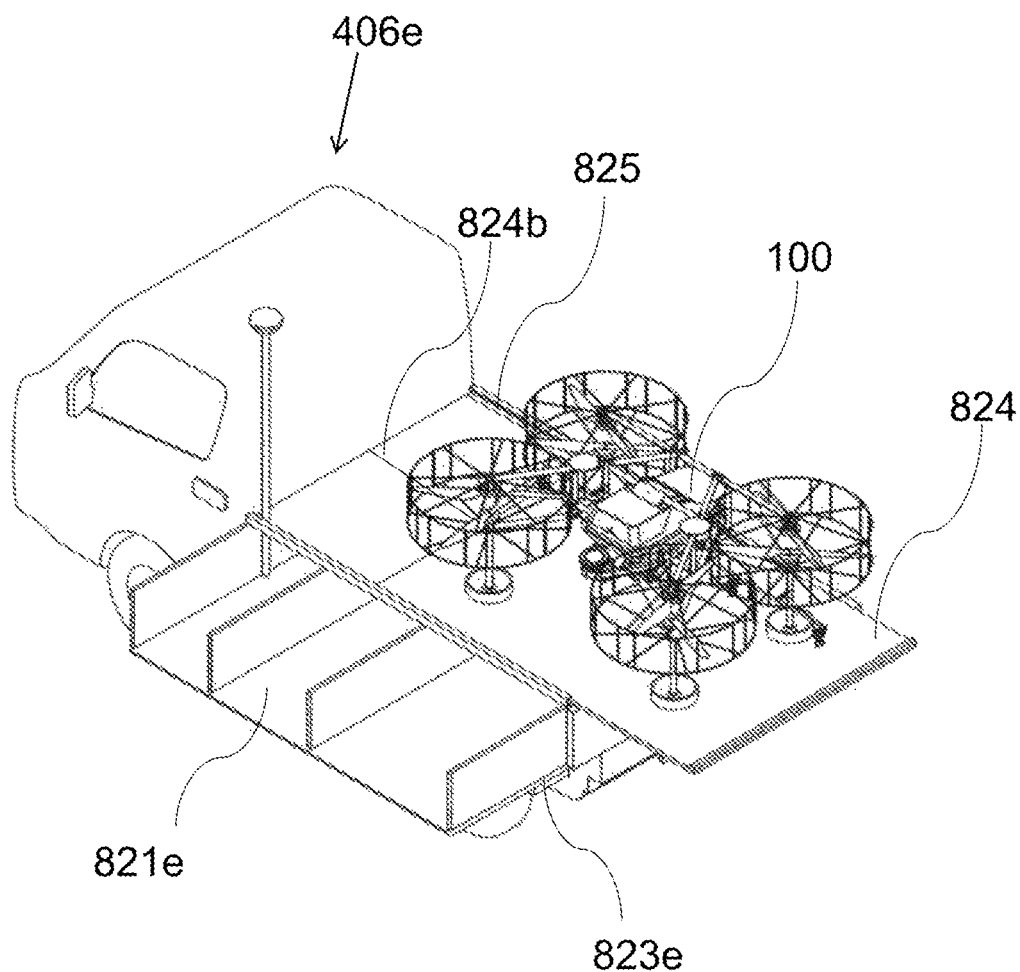
FIG. 19 is a general schematic diagram illustrating a scene of a movable body according to a fifth embodiment of the invention of the present application and the drone.

Referring to FIG. 19, a fifth embodiment of the movable body according to the present invention will be described focusing on differences from the embodiment described above. In a movable body 406e in the fifth embodiment, gates 823e on lateral sides are coupled to edge portions of the platform 82 with hinges, and a slidable trunk 821e is configured to be drawn from the trunk 821. With this configuration, when the slidable trunk 821e is drawn, the slidable trunk 821e is supported by the gates 823e, so that the slidable trunk 821e can be drawn with stability. In addition, in the present embodiment, the second upper plate 824a is arranged.

Movable Body (6)

Figure 20:
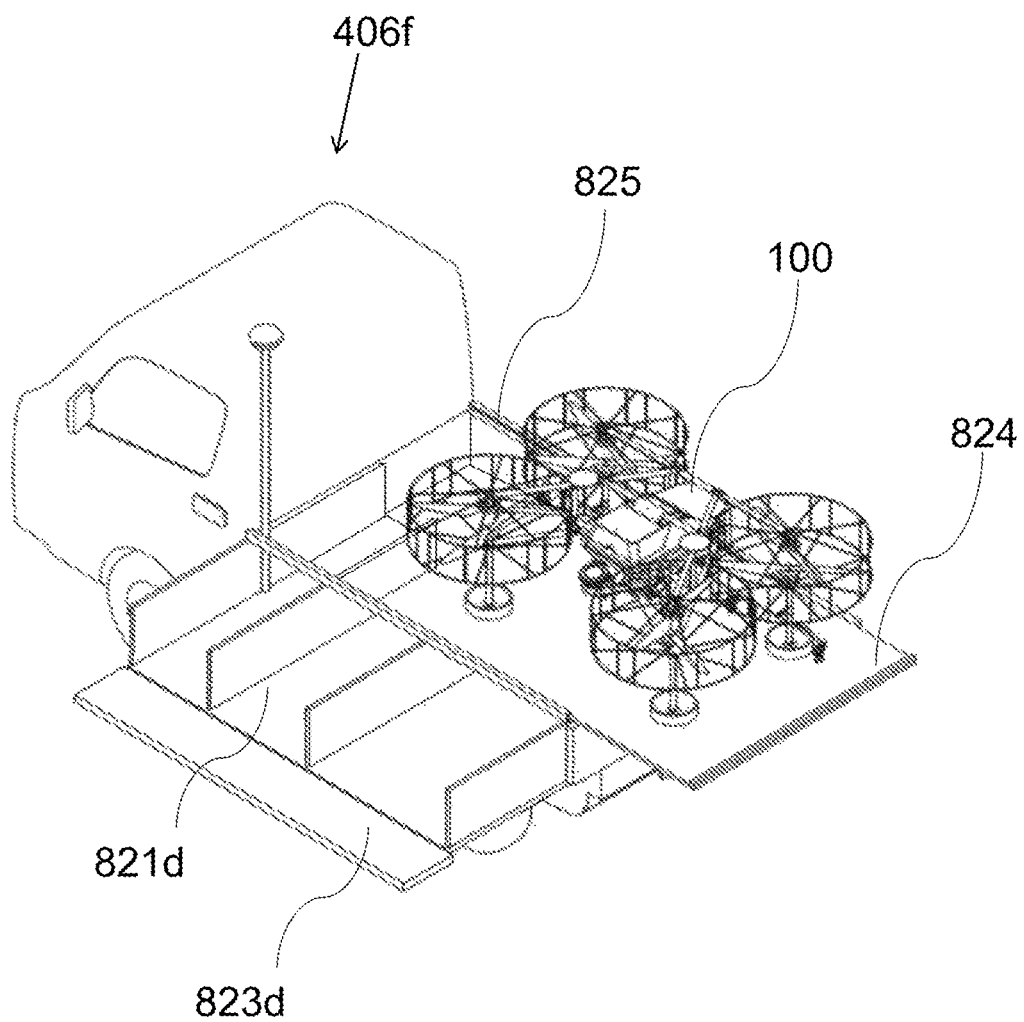
FIG. 20 is a general schematic diagram illustrating a scene of a movable body according to a sixth embodiment of the invention of the present application and the drone.

A movable body 406f in a sixth embodiment illustrated in FIG. 20 has a shape that is made by removing the second upper plate 824a of the movable body 406d in the fourth embodiment.

Movable Body (7)

Figure 21:
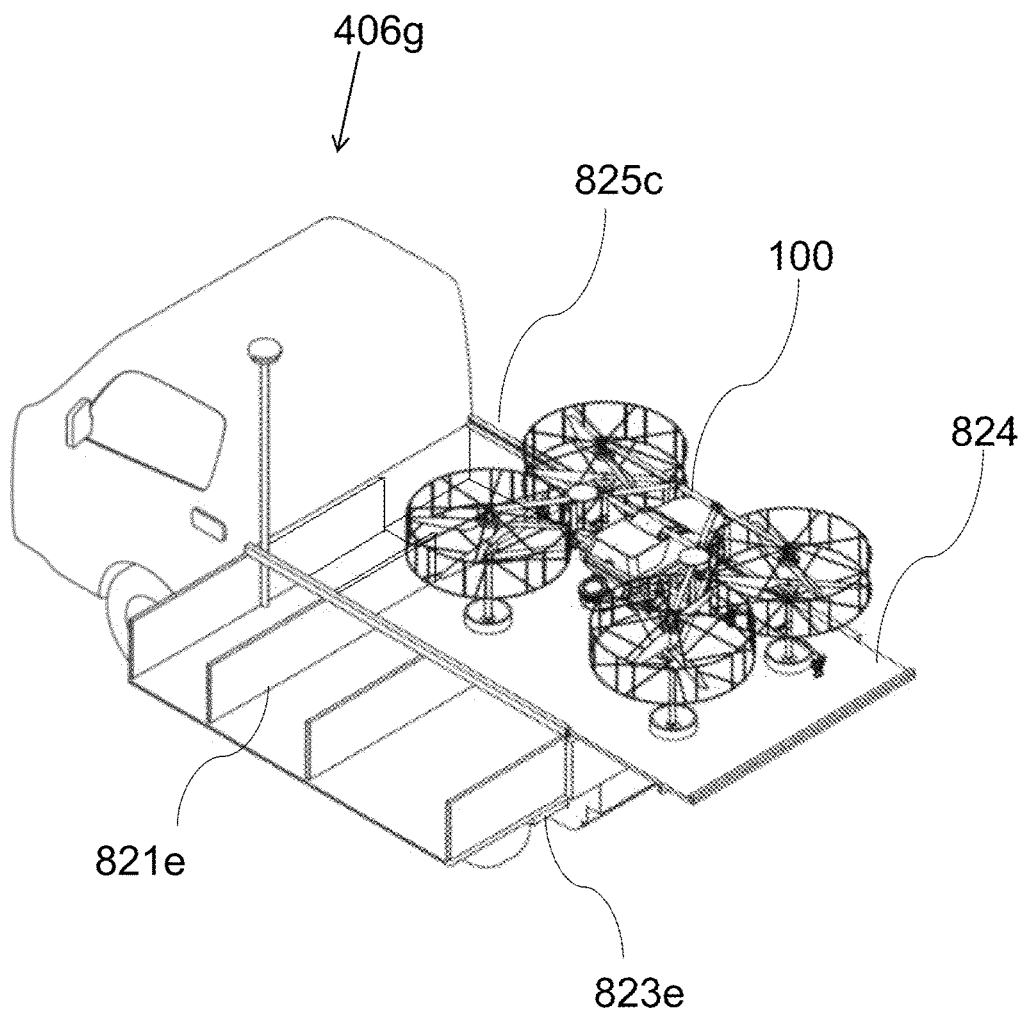
FIG. 21 is a general schematic diagram illustrating a scene of a movable body according to a seventh embodiment of the invention of the present application and the drone.

A movable body 406g in a seventh embodiment illustrated in FIG. 21 has a shape that is made by removing the second upper plate 824a of the movable body 406e in the fifth embodiment.

Movable Body (8)

Figure 22:
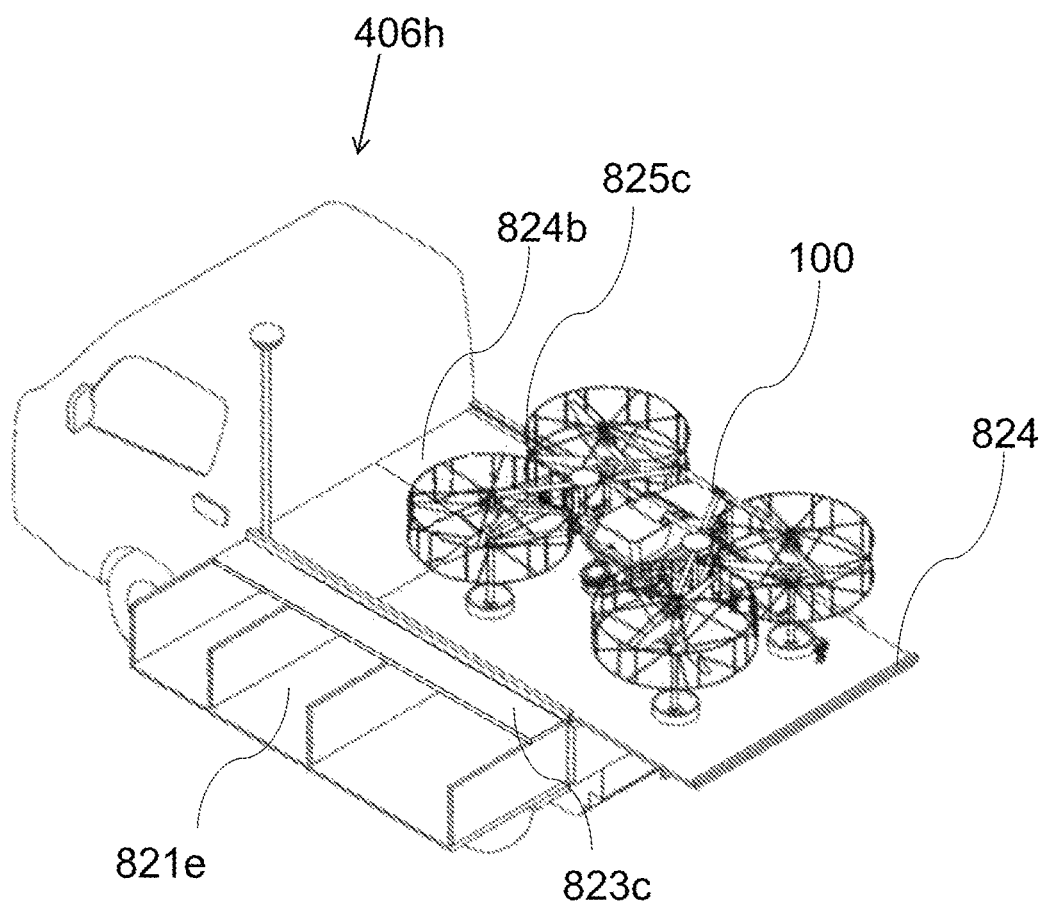
FIG. 22 is a general schematic diagram illustrating a scene of a movable body according to an eighth embodiment of the invention of the present application and the drone.
Figure 23:
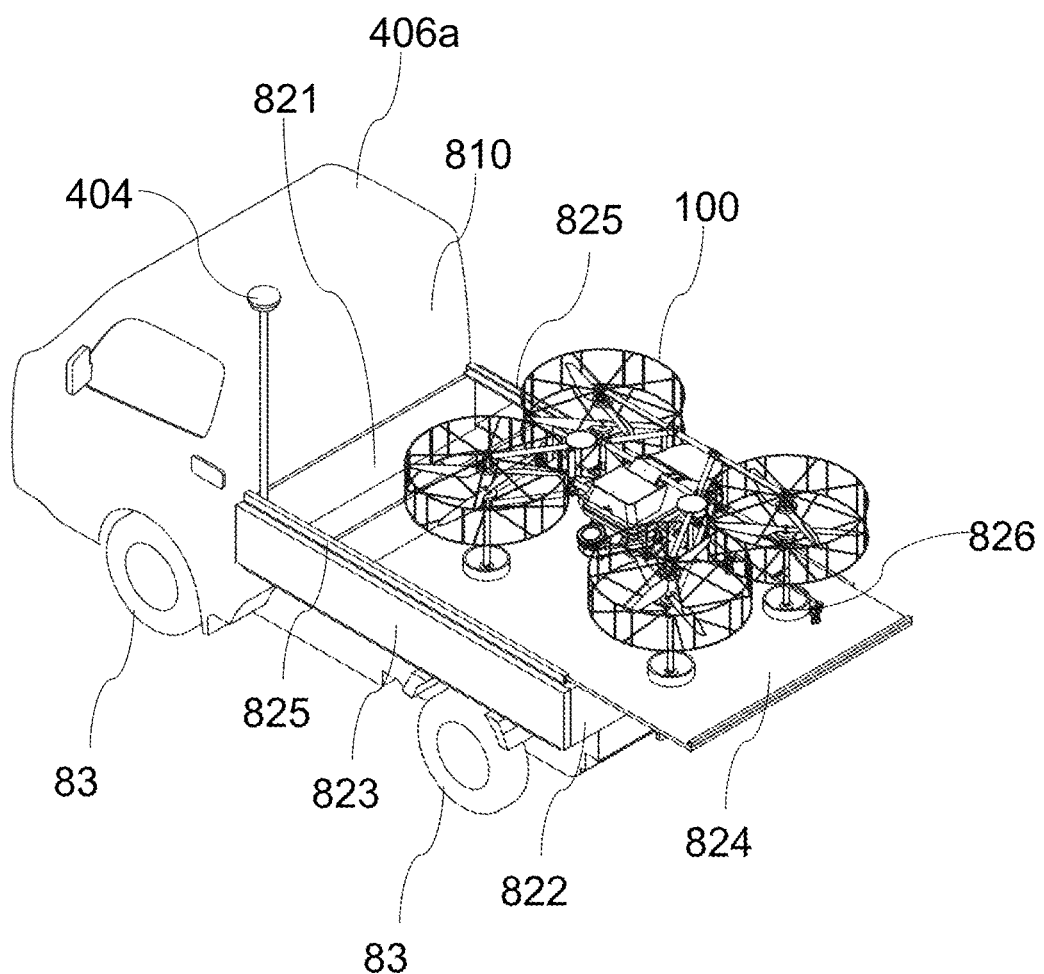
FIG. 23 is a perspective view illustrating a scene of the movable body according to the first embodiment of the invention of the present application illustrated in FIG. 9 viewed from another angle. Note that constituent components on an upper plate included in the movable body is omitted as appropriate.

A movable body 406h in an eighth embodiment illustrated in FIG. 22 is shaped such that the gates 823c in the third embodiment are arranged, and a slidable trunk 821e is drawn below the gates 823c. In addition, in the present embodiment, the second upper plate 824a is arranged.

Although the present description has been made about a drone for spreading an agricultural chemical agent as an example, note that a technical concept of the present invention is not limited to this example and is applicable generally to drones for other uses such as photographing and monitoring. In particular, the technical concept is applicable to machinery that operates autonomously. Furthermore, the movable body is not limited to a vehicle and may have any appropriate configuration.

Technically Advantageous Effects of the Invention of the Present Application

The drone system according to the present invention enables operational coordination between a drone and a movable body that is capable of moving with the drone aboard and allows the drone to make a takeoff and a landing, so as to maintain a high safety even in a case where the drone performs an autonomous flight.

The invention claimed is:

1. A drone system in which a drone and a movable body operate in coordination with each other, the movable body being capable of moving with the drone aboard and allowing the drone to make a takeoff and a landing, the movable body comprising:
- a takeoff-landing area on which the drone can be placed and that serves as a takeoff-landing point from and on which the drone takes off and lands;
- a movement control section capable of moving the movable body together with the drone aboard; and
- a movable body transmission section that sends information on the movable body, the drone comprising:
- a flight control section that causes the drone to fly; and
- a drone reception section that receives information on the movable body, wherein the drone retains a position of the takeoff-landing point at a time when the drone is on the takeoff-landing point, the drone sends information on a position at which the drone is to land, to the movable body, in a case where a position of the movable body is not a position that allows the drone to return, the movable body is caused to move to a position that allows the drone to return, or a user is notified of a request for moving the movable body.

2. The drone system according to claim 1, wherein the drone further sends information on at least one of a required time taken by the drone until a landing, and a planned landing time to the movable body.

3. The drone system according to claim 1, wherein the drone sends, to the movable body, information on at least one of a position at which the drone is to land, a required time until a landing, and a planned landing time.

4. The drone system according to claim 1, wherein the drone is a drone that flies within a target area to perform a predetermined operation, and the drone sends, to the movable body, information on an access route that connects the takeoff-landing point and an access point through which the drone enters the target area.

5. The drone system according to claim 1, wherein
the movable body includes an ambient environment acquiring section that acquires information on an ambient environment of the takeoff-landing point,
the movable body transmission section is capable of notifying the drone reception section of the information on the ambient environment, and
the drone determines appropriateness of a landing based on the information on the ambient environment.

6. The drone system according to claim 1, wherein
the movable body includes a mode switching mechanism capable of switching at least between a mode in which the movable body can move and a mode in which the drone can take off from and land on the movable body, and
the movable body transmission section is capable of notifying the drone reception section of the mode of the movable body.

7. The drone system according to claim 1, further comprising
an aboard state acquiring section capable of acquiring aboard information indicating whether the drone is fixed to the takeoff-landing point for the movable body to be in a state of being capable of moving safely, wherein
the aboard state acquiring section determines whether to permit the movable body to move or not based on the aboard information.

8. The drone system according to claim 7, wherein the movable body transmission section is capable of notifying the drone reception section of the aboard information.

9. The drone system according to claim 7, wherein the aboard state acquiring section is included in at least one of the drone and the movable body.

10. The drone system according to claim 1, wherein
the movable body further includes a driving state acquiring section that acquires driving information indicating whether the movable body is moving or is in a state of being capable of moving, and
the movable body is capable of notifying the drone reception section of the driving information via the movable body transmission section.

11. The drone system according to claim 1, wherein
the drone is equipped with a battery,
the drone is capable of performing replenishment of the battery loaded in the drone at the takeoff-landing point, and
the movable body is capable of notifying the drone of battery replenishment information indicating a status of a replenishment operation on the battery.

12. The drone system according to claim 11, wherein the drone is capable of notifying the movable body of an amount of electricity to be stored in the battery necessary to fly on a planned traveling route determined in advance.

13. The drone system according to claim 11, wherein
the drone is capable of notifying the movable body of a remaining amount of electricity stored in the battery, and
the movable body determines whether to perform replenishment of the battery based on the remaining amount of electricity.

14. The drone system according to claim 11, wherein the movable body is capable of notifying the drone reception section of an amount of electricity stored in the battery with which the drone can be replenished, via the movable body transmission section.

15. The drone system according to claim 1, wherein the drone is capable of notifying the movable body of a required time to return to the takeoff-landing point.

16. The drone system according to claim 1, wherein the movable body includes a base station capable of transmitting and receiving a radio wave for determining positions of the movable body and the drone.

17. The drone system according to claim 16, wherein the movable body is capable of notifying the drone reception section of information indicating that an anomaly occurs in the base station.

18. The drone system according to claim 1, wherein the movable body is capable of notifying the drone reception section of a remaining amount of a driving energy content of the movable body, via the movable body transmission section.

19. The drone system according to claim 1, wherein the movable body is capable of determining presence or absence of an obstacle present around the movable body and is capable of notifying the drone reception section of information on the obstacle, via the movable body transmission section.

20. The drone system according to claim 1, wherein the movable body further includes an interrupting operation section that controls a flight of the drone.

21. The drone system according to claim 20, wherein
the drone is capable of notifying the movable body of anomaly information indicating that an anomaly occurs in the drone, and
the interrupting operation section operates a flight of the drone upon receiving the anomaly information from the drone.

22. The drone system according to claim 1, wherein the drone is capable of notifying the movable body of a driving state of the drone.

23. A drone system in which a drone and a movable body operate in coordination with each other, the movable body being capable of moving with the drone aboard and allowing the drone to make a takeoff and a landing,
the movable body comprising:
a takeoff-landing area on which the drone can be placed and that serves as a takeoff-landing point from and on which the drone takes off and lands;
a movement control section capable of moving the movable body together with the drone aboard; and
a movable body transmission section that sends information on the movable body,
the drone comprising:
a flight control section that causes the drone to fly; and
a drone reception section that receives information on the movable body, wherein
the drone retains a position of the takeoff-landing point at a time when the drone is on the takeoff-landing point, and
the drone is a drone that flies within a target area to perform a predetermined operation, the drone sending information on an access route that connects the takeoff-landing point and an access point through which the drone enters the target area, to the movable body.

24. A drone system in which a drone and a movable body operate in coordination with each other, the movable body being capable of moving with the drone aboard and allowing the drone to make a takeoff and a landing,
the movable body comprising:
a takeoff-landing area on which the drone can be placed and that serves as a takeoff-landing point from and on which the drone takes off and lands;
a movement control section capable of moving the movable body together with the drone aboard; and
a movable body transmission section that sends information on the movable body,
the drone comprising:
a flight control section that causes the drone to fly; and
a drone reception section that receives information on the movable body, wherein
the drone retains a position of the takeoff-landing point at a time when the drone is on the takeoff-landing point, and
the drone is capable of predicting the number of times of suspension of an operation on a planned traveling route determined in advance and return to the takeoff-landing point and is capable of notifying the movable body of the predicted number of times.

25. The drone system according to claim 24, wherein the drone is capable of notifying the movable body of an amount of chemical agent necessary to be spread over a target area.

26. A drone system in which a drone and a movable body operate in coordination with each other, the movable body being capable of moving with the drone aboard and allowing the drone to make a takeoff and a landing,
the movable body comprising:
a takeoff-landing area on which the drone can be placed and that serves as a takeoff-landing point from and on which the drone takes off and lands;
a movement control section capable of moving the movable body together with the drone aboard; and
a movable body transmission section that sends information on the movable body,
the drone comprising:
a flight control section that causes the drone to fly; and
a drone reception section that receives information on the movable body, wherein
the drone retains a position of the takeoff-landing point at a time when the drone is on the takeoff-landing point,
the drone is equipped with chemical agent that can be spread over a target area,
the drone is capable of performing replenishment of the chemical agent loaded in the drone at the takeoff-landing point, and
the movable body is capable of notifying the drone reception section of chemical-agent replenishment information indicating a status of a replenishment operation on the chemical agent.

27. The drone system according to claim 26, wherein
the drone is capable of notifying the movable body of a remaining amount of the chemical agent, and
the movable body determines whether to perform replenishment of the chemical agent based on the remaining amount of the chemical agent.

28. The drone system according to claim 26, wherein the movable body is capable of notifying the drone reception section of an amount of the chemical agent being held with which the drone can be replenished, via the movable body transmission section.

29. A movable body that is capable of moving with a drone aboard and allows the drone to make a takeoff and a landing,
the movable body comprising:
a takeoff-landing area on which the drone can be placed and that serves as a takeoff-landing point from and on which the drone takes off and lands;
a movement control section capable of moving the movable body together with the drone aboard; and
a movable body transmission section that sends information on the movable body, wherein
the drone retains a position of the takeoff-landing point at a time when the drone is on the takeoff-landing point,
the movable body receives information on a position at which the drone is to land, from the drone, and
in a case where a position of the movable body is not a position that allows the drone to return, the movable body is caused to move to a position that allows the drone to return, or a user is notified of a request for moving the movable body.

30. A control method for a drone system in which a drone and a movable body operate in coordination with each other, the movable body being capable of moving with the drone aboard and allowing the drone to make a takeoff and a landing,
the movable body including:
a takeoff-landing area on which the drone can be placed and that serves as a takeoff-landing point from and on which the drone takes off and lands;
a movement control section capable of moving the movable body together with the drone aboard; and a movable body transmission section that sends information on the movable body, the drone including:
- a flight control section that causes the drone to fly; and
- a drone reception section that receives information on the movable body, the control method comprising:
- a step of retaining a position of the takeoff-landing point at a time when the drone is on the takeoff-landing point;
- a step of sending, by the drone, information on a position at which the drone is to land, to the movable body; and
- a step of, in a case where a position of the movable body is not a position that allows the drone to return, causing the movable body to move to a position that allows the drone to return or notifying a user of a request for moving the movable body.

31. A control program for a drone system in which a drone and a movable body operate in coordination with each other, the movable body being capable of moving with the drone aboard and allowing the drone to make a takeoff and a landing, the movable body including:
- a takeoff-landing area on which the drone can be placed and that serves as a takeoff-landing point from and on which the drone takes off and lands;
- a movement control section capable of moving the movable body together with the drone aboard; and
- a movable body transmission section that sends information on the movable body, the drone including:
- a flight control section that causes the drone to fly; and
- a drone reception section that receives information on the movable body, the control program causing a computer to execute:
- a command to cause the drone to retain a position of the takeoff-landing point at a time when the drone is on the takeoff-landing point;
- a command to cause the drone to send information on a position at which the drone is to land, to the movable body; and
- a command to cause, in a case where a position of the movable body is not a position that allows the drone to return, the movable body to move to a position that allows the drone to return or to notify a user of a request for moving the movable body.

32. A drone that is capable of being moved together with a movable body while being aboard the movable body, the drone comprising:

a flight control section that causes the drone to fly; and
a drone reception section that receives information on the movable body, wherein the drone sends, to the movable body, a position of a takeoff-landing point at a time when the drone is on the takeoff-landing point, the drone sends, to the movable body, information on a position at which the drone is to land, and in a case where a position of the movable body is not a position that allows the drone to return, the movable body is caused to move to a position that allows the drone to return, or a user is notified of a request for moving the movable body.

* * * * *